US010094297B2

(12) United States Patent
Kusumi et al.

(10) Patent No.: US 10,094,297 B2
(45) Date of Patent: Oct. 9, 2018

(54) POWER GENERATION SYSTEM AND POWER GENERATION METHOD

(71) Applicant: Hitachi, Ltd., Chiyoda-ku, Tokyo (JP)

(72) Inventors: Naohiro Kusumi, Tokyo (JP); Noriaki Hino, Tokyo (JP); Aung Ko Thet, Tokyo (JP); Tomofumi Shiraishi, Tokyo (JP); Masatoshi Yoshimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 15/323,458

(22) PCT Filed: Sep. 9, 2014

(86) PCT No.: PCT/JP2014/073756
§ 371 (c)(1),
(2) Date: Jan. 3, 2017

(87) PCT Pub. No.: WO2016/038672
PCT Pub. Date: Mar. 17, 2016

(65) Prior Publication Data
US 2017/0145925 A1  May 25, 2017

(51) Int. Cl.
*F02C 9/56* (2006.01)
*F02C 9/20* (2006.01)
(Continued)

(52) U.S. Cl.
CPC .............. *F02C 9/20* (2013.01); *F01K 11/02* (2013.01); *F02C 6/18* (2013.01); *F02C 7/057* (2013.01);
(Continued)

(58) Field of Classification Search
CPC ............ F05D 2220/76; F05D 2270/05; F05D 2270/06; F05D 2270/061; H02P 9/04;
(Continued)

(56) References Cited

U.S. PATENT DOCUMENTS 9,982,555 B2 * 5/2018 Thet ...................... F01D 15/10
2005/0056021 A1   3/2005 Belokon et al.
(Continued)

FOREIGN PATENT DOCUMENTS

JP    2005-151746 A    6/2005
JP    2007-505261 A    3/2007
(Continued)

OTHER PUBLICATIONS

International Search Report (PCT/ISA/210) issued in PCT Application No. PCT/JP2014/073756 dated Nov. 11, 2014 with English translation (5 pages).
(Continued)

*Primary Examiner* — William H Rodriguez
(74) *Attorney, Agent, or Firm* — Crowell & Moring LLP

(57) ABSTRACT

In order to enhance the tracking performance of power generation equipment with respect to a load variation and increase the reliability of the power generation equipment, a dynamic characteristic model simulating the dynamic characteristics of a multi-shaft gas turbine is used to calculate an output prediction value of a first power generator in a case where a combustor is controlled so as to match the output of the first power generator to an output target value; on the basis of the output target value and the output prediction value of the first power generator, a first power generator output instruction value as an instruction value for the output from the first power generator to a power system and a second power generator output instruction value as an instruction value for the output from a second power generator to the power system are calculated; and the combustor is controlled on the basis of the first power generator output instruction value and a frequency convertor is controlled on the basis of the second power generator output instruction value.

14 Claims, 16 Drawing Sheets

(51) Int. Cl.
*F02C 6/18* (2006.01)
*F02C 7/057* (2006.01)
*F02C 7/36* (2006.01)
*F01K 11/02* (2006.01)
*H02K 7/18* (2006.01)

(52) U.S. Cl.
CPC ............ *F02C 7/36* (2013.01); *F05D 2220/32* (2013.01); *F05D 2220/72* (2013.01); *F05D 2220/76* (2013.01); *F05D 2270/061* (2013.01); *H02K 7/1823* (2013.01)

(58) Field of Classification Search
CPC . H02K 7/1823; F02C 9/20; F02C 9/26; F02C 9/56; F02C 7/36; F02C 6/18; F01K 23/10; F01K 11/02
See application file for complete search history.

(56) References Cited

U.S. PATENT DOCUMENTS

| | | |
|---|---|---|
| 2006/0150633 A1 | 7/2006 | McGinley et al. |
| 2009/0320438 A1 | 12/2009 | Koganezawa et al. |
| 2014/0216047 A1* | 8/2014 | Morisaki .................. F01D 5/06 60/774 |
| 2015/0171705 A1* | 6/2015 | Hino ...................... F01D 15/10 290/1 A |
| 2016/0252015 A1* | 9/2016 | Kusumi .................. F03D 9/00 290/40 B |
| 2016/0356171 A1* | 12/2016 | Thet ........................ F01D 15/10 |
| 2017/0138272 A1* | 5/2017 | Kusumi .................. F02C 7/057 |
| 2017/0159577 A1* | 6/2017 | Hino ........................ F02C 9/54 |
| 2017/0346427 A1* | 11/2017 | Thet ........................ F02C 3/10 |
| 2017/0363013 A1* | 12/2017 | Hino ........................ F02C 9/20 |

FOREIGN PATENT DOCUMENTS

| | | |
|---|---|---|
| JP | 2008-285571 A | 11/2008 |
| JP | 2010-25069 A | 2/2010 |
| JP | 2010-65636 A | 3/2010 |
| JP | 2010-156308 A | 7/2010 |

OTHER PUBLICATIONS

Japanese-language Written Opinion (PCT/ISA/237) issued in PCT Application No. PCT/JP2014/073756 dated Nov. 11, 2014 (3 pages).

* cited by examiner

FIG. 4

RELATED INFORMATION DATABASE 300

| TIME | WEATHER | TEMPERATURE [°C] | WIND DIRECTION [DEGREE] | WIND SPEED [m/s] | HUMIDITY [%] | AMOUNT OF SOLAR RADIATION [kW/m2] |
|---|---|---|---|---|---|---|
| 2010/01/01 00:00:00 | FINE | 22.1 | 20 | 1.6 | 40.1 | 4.8 |

FIG. 5

OPERATION INFORMATION DATABASE 600

| PID NUMBER | PID150 | PID151 | PID152 | PID153 | PID154 | ... |
|---|---|---|---|---|---|---|
| TIME | F | T | P | E | D | ... |
| YEAR/MONTH/DAY HOUR:MINUTE:SECOND | Kg/s | °C | Mpa | MW | ppm | ... |
| 2010/01/01 0:00:00 | 300 | 580 | 18.5 | 450 | 100 | ... |
| 2010/01/01 0:00:01 | 300 | 579 | 18.5 | 450 | 100 | ... |
| 2010/01/01 0:00:02 | 300 | 579 | 18.5 | 450 | 98 | ... |
| ... | ... | ... | ... | ... | ... | ... |

FIG. 14

| | TREND DISPLAY SETTING | | | | | × |

○ MEASUREMENT SIGNAL DISPLAY  981

| NAME | RANGE | | |
|---|---|---|---|
| | LOWER LIMIT | UPPER LIMIT | |
| ▼ | | | (kg/s) |
| ▼ | | | (%) |
| ▼ | | | (%) |
| ▼ | | | (%) |
| ▼ | | | (%) |

982

TIME

[ ] TO [ ]

983

DISPLAY

○ RELATED INFORMATION DISPLAY  984

| WEATHER | TEMPERATURE [°C] | WIND DIRECTION [DEGREE] | WIND SPEED [m/s] | HUMIDITY [%] | AMOUNT OF SOLAR RADIATION [kW/m2] |
|---|---|---|---|---|---|
| ○ | ● | ○ | ● | ○ | ○ |

| GT INLET TEMPERATURE | GT EXHAUST TEMPERATURE | TRANSFORMER COOLANT TEMPERATURE |
|---|---|---|
| ● | ○ | ● |

985

TIME

[ ] TO [ ]

986

DISPLAY

989

RETURN

POWER GENERATION SYSTEM AND POWER GENERATION METHOD

TECHNICAL FIELD

The present invention relates to a power generation system.

BACKGROUND ART

A thermal power plant is a power generation apparatus that generates power by driving a power generation apparatus using combustion heat taken out through combustion mainly of fossil fuel, and various types of power generation apparatuses are present depending on combinations of fuel and the power generation apparatus. Examples of such apparatuses include a steam turbine power generation apparatus that generates power by burning coal or heavy oil in a boiler and generating steam using combustion heat therefrom to drive a steam turbine, a gas turbine power generation apparatus that generates power by compressing atmospheric air with a compressor, mixing and burning the compressed air with fuel in a combustor, and driving a gas turbine using combustion air therefrom, or a combined cycle power generation apparatus that generates steam in an exhaust heat recovery boiler using an exhaust gas burned in a gas turbine and drives a steam turbine with the steam.

Meanwhile, power generation using renewable energy, such as natural energy, has been attracting attentions from a viewpoint of reducing carbon dioxide. In particular, power generation using wind power generation or solar power generation has been rapidly spreading. However, it is not possible to control natural conditions, and power generation output to be obtained is not constant but varies. If such a power supply is connected to a system, the system becomes unstable, and there is a risk that it is difficult to keep a constant frequency of the system. In addition, the steam power generation, such as the power generation using a gas turbine, is generally designed to reach the maximum efficiency at the time of application of a rated load, and thus, the efficiency decreases during an operation with a partial load.

PTL 1 discloses a control apparatus that issues a power generation instruction according to the system load and adjusts an exhaust heat recovery volume or a heat storage volume of a thermoelectric load in a power system in which a plurality of power supplies and thermoelectric loads having different volumes, such as a gas engine and a gas turbine power generator, are connected to correspond to unstable power supply of wind power generation or solar power generation.

PTL 2 discloses a combined plant that supplies surplus power obtained by wind power generation equipment and gas turbine equipment heavy oil reformation equipment.

PTL 3 discloses a system that realizes improvement in efficiency of a partial load by connecting an auxiliary power generator/motor to a multi-shaft gas turbine engine including a plurality of spools and injecting mechanical power into the spools or extracting the mechanical power from the spools.

CITATION LIST

Patent Literature

PTL 1: JP 2005-151746 A
PTL 2: JP 2008-285571 A
PTL 3: JP 2007-505261 A

SUMMARY OF INVENTION

Technical Problem

The power generation output using the renewable energy, and particularly, the wind power generation or the solar power generation is affected by a variation of climate, which gives an influence on stabilization of a system. From now on, an increase in introduction of renewable energy will be further accelerated from a viewpoint of environment and diversification of energy sources, and such an influence applied to the system will be more apparent.

In the methods disclosed in PTL 1 and PTL 2, a renewable energy generation apparatus is combined with a power generation apparatus such as a gas turbine power generation apparatus, and an additional apparatus, configured to recover surplus power relative to necessary power supply amount is further provided. However, output characteristics of the respective power generation apparatuses are not considered in the above-described techniques, and thus, it is difficult to say that regulations of a system to be connected is always satisfied when actual output of the power generation apparatus with respect to a power generation instruction and power generation output to be obtained by the renewable energy generation apparatus match each other. Therefore, it is difficult to correspond to generation and supply of power within the regulations of the system to be connected with respect to a variation in output of the renewable energy.

In addition, there is a case in which inlet temperature of the gas turbine becomes a limit value of higher as power generation of the auxiliary power generator/motor is added to the gas turbine power generation apparatus in the method disclosed in PTL 3.

The present invention has been made in view of the above-described problems, and an object thereof is to provide a technique that enhances a tracking performance of power generation equipment with respect to a load variation and enhances reliability of the power generation equipment.

Solution to Problem

In order to solve the above-described problems, a power generation system as an aspect of the present invention is provided with: a multi-shaft gas turbine, which includes a high pressure turbine shaft, a compressor which generates compressed air according to rotation of the high pressure turbine shaft, a combustor which generates a combustion gas by mixing and burning the compressed air and fuel, a high pressure turbine which rotates by receiving the combustion gas and drives the high pressure turbine shaft, a low pressure turbine shaft, and a low pressure turbine which rotates by receiving a gas discharged from the high pressure turbine and drives the low pressure turbine shaft; a first power generator that is connected to a power system, generates power using the rotation of the low pressure turbine shaft, and outputs the generated power to the power system; a second power generator that accelerates or decelerates the high pressure turbine shaft according to input or output of power; a frequency converter that is connected to a terminal of the second power generator; a transformer that is connected between the frequency converter and a terminal of the first power generator; and a control unit that stores an output target value as a time-series target value of output of the power generation system, calculates an output prediction value of the first power generator in a case where a combustor is controlled so as to match the output of the first power generator to the output target value using a dynamic characteristic model simulating a dynamic characteristic of the multi-shaft gas turbine, calculates a first power generator output instruction value as an instruction value for the output from the first power generator to the power system and a second power generator output instruction value as an instruction value for the output from the second power generator to the power system based on the output target value and the output prediction value of the first power generator, controls the combustor based on the first power generator output instruction value, and controls the frequency converter based on the second power generator output instruction value. When the first power generator output instruction value is smaller than the output target value, the frequency converter performs frequency-conversion of the output of the second power generator and outputs the converted output to the power system based on an instruction from the control unit, accordingly, the second power generator outputs power to be obtained by decelerating the high pressure turbine shaft to the frequency converter, and the transformer boosts the output of the frequency converter and outputs the boosted output to the power system. When the first power generator output instruction value is larger than the output target value, the frequency converter performs frequency-conversion of a part of the output of the first power generator and outputs the converted output to the second power generator based on an instruction from the control unit, accordingly, the transformer steps down the part of the output of the first power generator and outputs the stepped-down output to the frequency converter, and the second power generator accelerates the high pressure turbine shaft using the output of the frequency converter.

Advantageous Effects of Invention

It is possible to enhance the tracking performance of the power generation equipment with respect to the load variation and to enhance the reliability of the power generation equipment.

BRIEF DESCRIPTION OF DRAWINGS

FIG. 4 illustrates content of a related information database 300.

FIG. 5 illustrates content of an operation information database 600.

FIG. 14 illustrates a trend display setting screen.

DESCRIPTION OF EMBODIMENTS

Hereinafter, embodiments of the present invention will be described with reference to the drawings.

First Embodiment

A two-shaft gas turbine to which the present invention is applied and one including the two-shaft gas turbine will be described in the present embodiment.

Figure 1:
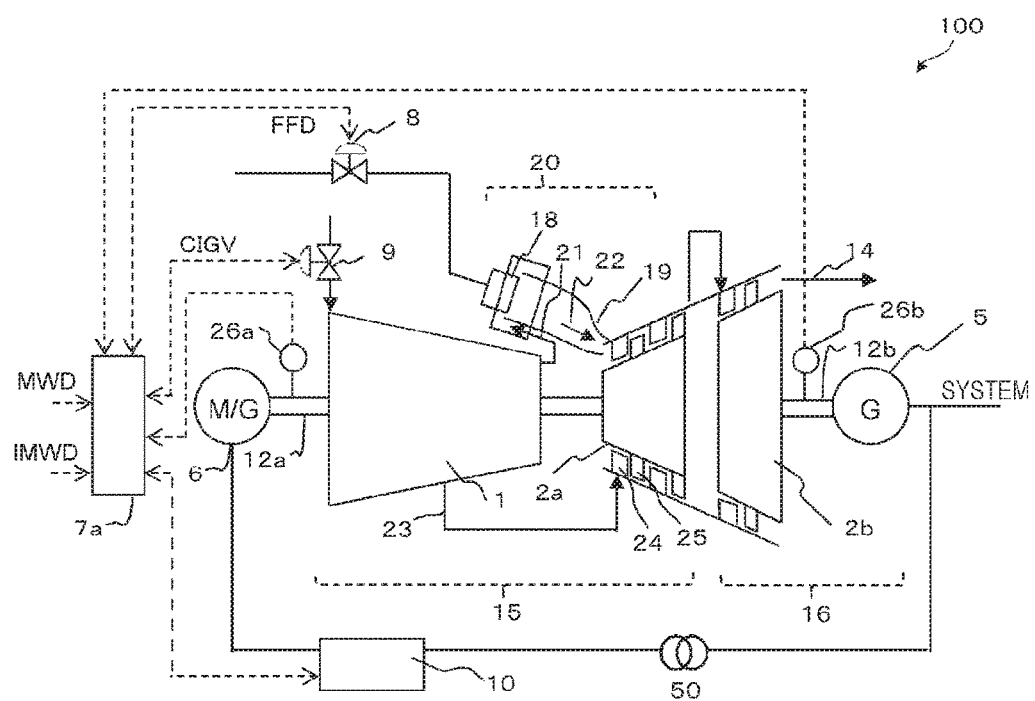
FIG. 1 illustrates a two-shaft gas turbine power generation apparatus 100 according to an embodiment of the present invention.

FIG. 1 illustrates a two-shaft gas turbine power generation apparatus 100 according to an embodiment of the present invention.

The two-shaft gas turbine power generation apparatus 100 includes a gas generator 15, a power turbine 16, a GT (Gas Turbine) control apparatus (controller) 7a, and a frequency converter 10.

The power turbine 16 includes a low pressure turbine 2b, a low pressure turbine shaft 12b which is a shaft of the low pressure turbine 2b, and a power generator 5 which converts a rotational force of the low pressure turbine shaft 12b into power. In the gas turbine for power generation, the power generator 5 is driven at substantially constant low pressure turbine rotational speed by rotation of the power turbine 16 at substantially constant low pressure turbine rotational speed in order to make a frequency of the power to be substantially constant. The power generated by the power generator 5 is supplied to a house demanding power via a power cable.

The gas generator 15 is configured to include a compressor 1, a combustor 20, a high pressure turbine 2a, an electric motor/auxiliary power generator (M/G) 6, and a high pressure turbine shaft 12a. The M/G 6, the compressor 1, and the high pressure turbine 2a share the high pressure turbine shaft 12a.

The gas generator 15 has a structure to be mechanically separated from the power turbine 16, and thus, is capable of rotating at high pressure turbine rotational speed which is different from the low pressure turbine rotational speed.

The compressor 1 generates compressed air 21 by sucks in and compressing atmospheric air. In addition, an IGV (inlet guide vane) 9 is provided at an inlet (intake port) of air suction of the compressor 1. The IGV 9 changes an opening area of the compressor 1 through its own rotation. When the GT control apparatus 7a changes an opening degree CIGV of the IGV 9, it is possible to change the amount of air that flows into the compressor 1. Incidentally, another speed governor may be used to adjust the high pressure turbine rotational speed without being limited to the IGV 9. In the present embodiment, it is also possible to change the amount of air flowing into the compressor 1 by adjusting the high pressure turbine rotational speed using the M/G 6.

The combustor 20 mixes the compressed air 21 generated by the compressor 1 with fuel from a fuel pipe at a substantially constant air-fuel ratio (mass ratio) and generates a combustion gas 22 by burning the mixture in a burner 18. The combustion gas 22 first flows into the high pressure turbine 2a after passing through a combustor liner 19. The fuel burned in the burner 18 is adjusted by a fuel flow rate control valve 8 provided in the fuel pipe. The GT control apparatus 7a controls the fuel flow rate control valve 8.

The high pressure turbine 2a obtains a rotational force from kinetic energy of the high-temperature and high-pressure combustion gas 22. The rotational force is transmitted to the compressor 1 through the high pressure turbine shaft 12a to rotate the compressor 1. The combustion gas 22 flows into the low pressure turbine 2b of the power turbine 16 after a part of the kinetic energy thereof is extracted by the high pressure turbine 2a. The low pressure turbine 2b obtains a rotational force from the kinetic energy of the combustion gas 22 and transmits the rotational force to the power generator 5 through the low pressure turbine shaft 12b to rotate the power generator 5. The combustion gas 22 having passed through the low pressure turbine 2b is discharged as exhaust 14.

In addition, part of the compressed air 21 generated by the compressor 1 is bled as turbine cooling air 23 and supplied to turbines 2 including the high pressure turbine 2a and the low pressure turbine 2b without passing through the combustor 20. Part of the turbine cooling air 23 is used for cooling a stator vane 24 and a rotor vane 25 forming the turbine 2.

In addition, a terminal of the M/G 6 rotating together with the high pressure turbine shaft 12a is connected to a system (power system) via a frequency converter 10 and a transformer 50, and can adjust an operation of the high pressure turbine shaft 12a by exchanging power with the system. To be specific, the M/G 6 operates as a motor and supplies energy to the high pressure turbine shaft 12a when the power is supplied to the M/G 6 from the frequency converter 10. In contrast, the M/G 6 operates as a power generator and reduces energy of the high pressure turbine shaft 12a when the power is extracted from the M/G 6 by the frequency converter 10.

The GT control apparatus 7a receives input, which includes the number of rotations of the high pressure turbine detected by a rotational speed detector 26a for the high pressure turbine, the number of rotations of the low pressure turbine detected by a rotational speed detector 26b for the low pressure turbine, and an output instruction value (MWD) of the power generator indicating a target value of power to be output from the power generator 5 to the system, and an output instruction value (the IMWD) of the auxiliary power generator indicating a target value of power to be output from the M/G 6 to the system, and generates and transmits an FFD signal to control the fuel flow rate control valve 8, a CIGV signal to control the opening degree of the IGV 9, and a frequency converter control signal to control the frequency converter 10. Incidentally, the GT control apparatus 7a may have various protection functions in order to prevent an excessive temperature increase of each unit, propagation of trouble or the like. In addition, the GT control apparatus 7a acquires a measurement value from a sensor that measures an atmospheric temperature, an exhaust temperature which is temperature of the exhaust 14 of the low pressure turbine 2b, a transformer coolant temperature which is temperature of a coolant of the transformer 50, and the like. The exhaust temperature changes depending on a gas turbine inlet temperature which is temperature of the combustion gas 22 at the inlet of the high pressure turbine 2a.

It is difficult for a two-shaft gas turbine which does not include the M/G 6 to completely track an abrupt power generation request due to mechanical delay and the like. In the present embodiment, the high-speed turbine shaft 12a rotates at a variable speed, and a variation is absorbed by changing the high pressure turbine rotational speed using the M/G 6. In addition, improvement in atmospheric temperature characteristic and improvement in efficiency at the time of application of a partial load are realized through the electrical assist of the compressor 1 obtained using the M/G 6.

In the present embodiment, the GT control apparatus 7a controls the high pressure turbine rotational speed using the M/G 6 to control output power of the two-shaft gas turbine power generation apparatus 100 in addition to the control of the fuel flow rate. For example, the GT control apparatus 7a can decrease the high pressure turbine rotational speed using the M/G 6 to release rotational energy of the shaft as power when it is desired to increase the output, or increase the high pressure turbine rotational speed using the M/G 6 to store the power as the rotational energy of the shaft when it is desired to decrease the output. When the output is changed regardless of the fuel flow rate, it is possible to obtain a high output changing speed while preventing a decrease in service life caused by thermal fatigue of the turbine 2 or the like.

Further, it is possible to set the volume of the frequency converter 10 of the present embodiment to be smaller than the volume of the power generator 5. In the two-shaft gas turbine power generation apparatus 100 of the present embodiment, the low pressure turbine 2b responsible for the majority of output rotates at a constant speed. Only the high pressure turbine 2a operating at the variable speed requires the frequency converter 10, and thus, it is possible to decrease the volume of the frequency converter 10. For example, when it is desired to change the output equivalent to 10% or less of the rated output of the power generator 5, in addition to the output change using the fuel flow rate, it is possible to cope with such demand using the frequency converter 10 having a volume equivalent to 10% of the rated output. Accordingly, it is possible to reduce the cost of the frequency converter 10.

Hereinafter, an operation of the two-shaft gas turbine power generation apparatus 100 will be described.

The GT control apparatus 7a performs control to obtain balance such that the energy recovered by the high pressure turbine and the energy consumed by the compressor 1 are equal to each other. In general, this control method includes changing the flow rate of air sucked by the compressor by adjustment of the opening degree of the IGV 9. For example, when the high pressure turbine rotational speed is higher than a setting value, the GT control apparatus 7a increases the opening degree of the IGV 9 and increases the flow rate of the air sucked by the compressor such that the kinetic energy consumed by the compressor 1 increases, and the high pressure turbine rotational speed decreases. In contrast, when the high pressure turbine rotational speed is lower than the setting value, the GT control apparatus 7a decreases the opening degree of the IGV 9 such that the high pressure turbine rotational speed increases.

In addition, the GT control apparatus 7a changes the output of the power generator 5 by changing the fuel flow rate. At this time, the GT control apparatus 7a supplies necessary fuel to the combustor 20 by calculating a fuel flow rate instruction value (FFD) indicating a necessary fuel flow rate and sending the calculated value to the fuel flow rate control valve 8 according to a power generator output instruction value (MWD) instructed from the outside, and obtains balance between the output of the generator 5 and the energy recovered from the combustion gas 22 by the low pressure turbine 2b. Accordingly, the low pressure turbine rotational speed is controlled to be substantially constant. Further, the GT control apparatus 7a obtains balance between the energy to be recovered from the combustion gas 22 by the high pressure turbine 2a and the energy necessary for driving of the compressor 1 and controls the opening degree of the IGV 9 such that the high pressure turbine rotational speed is equal to the setting value at this time. In this manner, the high pressure turbine rotational speed can be changed without being not uniquely determined.

Figure 2:
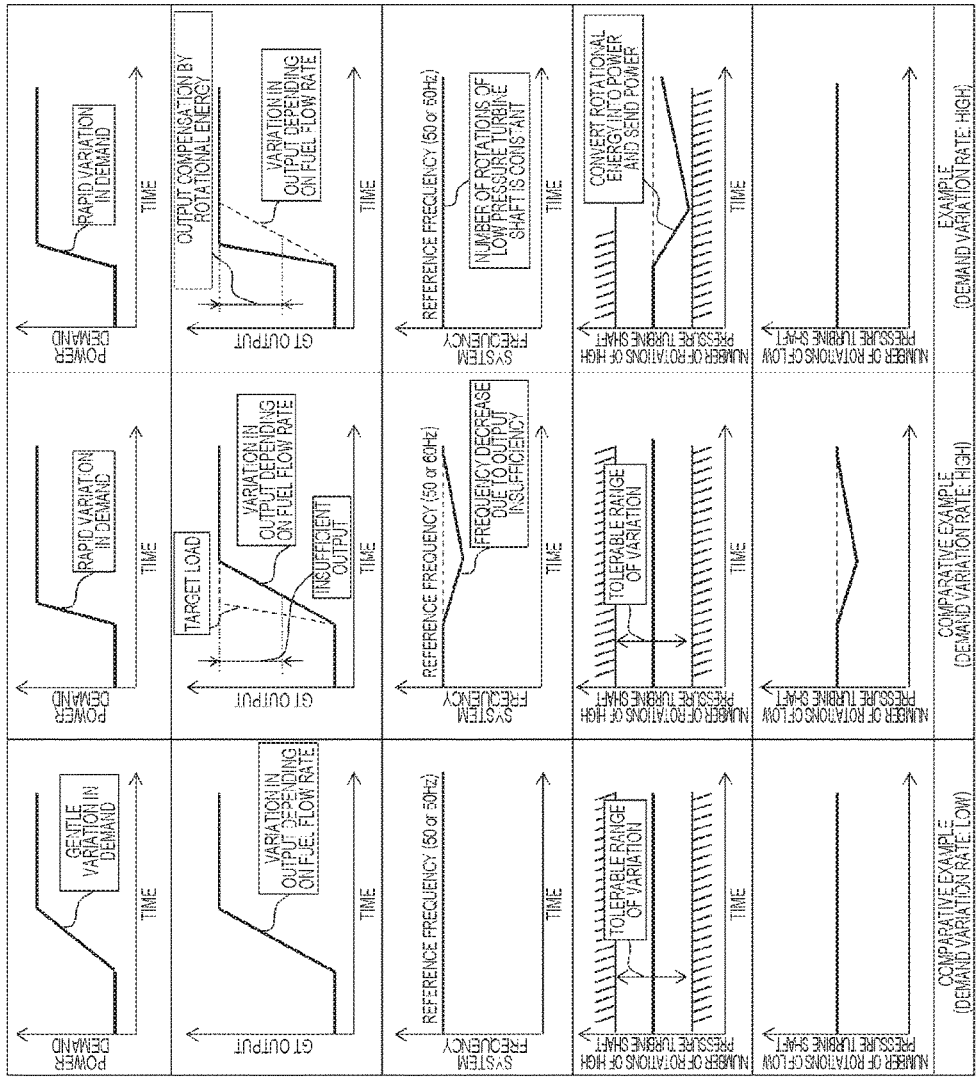
FIG. 2 illustrates output of the two-shaft gas turbine power generation apparatus 100 with respect to a variation in demand.

FIG. 2 illustrates output of the two-shaft gas turbine power generation apparatus 100 with respect to a variation in demand.

A description will be given regarding a case in which the demand increases in a two-shaft gas turbine power generation apparatus of comparative example which does not include the M/G 6 and the two-shaft gas turbine power generation apparatus 100 of the present embodiment. Among graphs arranged in five rows and three columns in the drawing, the first column on the left represents an operation in a case in which a demand variation rate is low (demand gently increases) in a gas turbine of the comparative example, the second column at the center represents an operation in a case in which the demand variation rate is high (demand rapidly increases) in the gas turbine of the comparative example, and the third column on the right represents an operation in a case in which the demand variation rate is high (demand rapidly increases) in the two-shaft gas turbine power generation apparatus 100 of the present embodiment.

A graph on the uppermost first row among the graphs of the five rows in the respective columns represents a temporal change (demand variation) of a variation in power. A graph on the below second row represents a temporal change of gas turbine output. A graph on the below third row represents a temporal change of a system frequency. A graph on the below fourth row represents a temporal change of the high pressure turbine rotational speed. A graph on the lowermost fifth row represents a temporal change of the low pressure turbine rotational speed. A horizontal axis of these graphs of the five rows is the common time axis.

When a demand variation is small, it is possible to absorb the demand variation through output control using the fuel flow rate in the gas turbine of the comparative example, but the low pressure turbine rotational speed decreases and the system frequency decreases in accordance therewith if the output change does not track a target value according to the demand variation and the output is insufficient when the demand variation increases. In contrast, when the output is excessive, the low pressure turbine rotational speed increases, and the system frequency also increases in accordance therewith.

In the two-shaft gas turbine power generation apparatus 100 of the present embodiment, the insufficient amount of the output change through the control of the fuel flow rate is extracted from the M/G 6 using the frequency converter 10. When the output is insufficient only with the control of the fuel flow rate, the amount of insufficiency is compensated by decreasing the high pressure turbine rotational speed through the control of the frequency converter 10 and converting the rotational energy to power. At this time, the opening degree of the IGV 9 is determined such that the energy consumed by the compressor 1 and the energy recovered by the high pressure turbine 2a are balanced even though the high pressure turbine rotational speed is decreased. In addition, an output frequency of the M/G 6 according to the high pressure turbine rotational speed is converted into a reference frequency by the frequency converter 10. In this manner, it is possible to stabilize the system frequency even when the demand rapidly changes. Here, it is possible to use a combination of known inverter and converter or the like as the frequency converter 10. For example, the frequency converter 10 converts the AC power input from one terminal into the DC power, and further converts the DC power into the AC power having an instructed frequency, and outputs the AC power to the other terminal.

When the demand increases, the control apparatus 200 controls the combustor 20 to increase the fuel flow rate of the combustor 20 and controls the frequency converter 10 to decelerate the high pressure turbine shaft 12a using the M/G 6. When the demand decreases, the control apparatus 200 controls the combustor 20 to decrease the fuel flow rate and controls the frequency converter 10 to accelerate the high pressure turbine shaft 12a using the M/G 6. A response of output obtained by the control of the frequency converter 10 is faster than a response of output obtained by the control of the combustor 20, and thus, the two-shaft gas turbine power generation apparatus 100 of the present embodiment can track the rapid change of the demand.

As described above, the GT control apparatus 7a determines the opening degree of the IGV 9 along with the increase of the fuel flow rate such that the kinetic energy to be consumed by the compressor 1 and the kinetic energy received by the combustion gas 22 from the high pressure turbine 2a are balanced. To be specific, the GT control apparatus 7a keeps the flow rate of the air sucked by the compressor to be substantially constant by opening the IGV 9 when the high pressure turbine rotational speed decreases and closing the IGV 9 when the high pressure turbine rotational speed increases. Accordingly, it is possible to keep the air-fuel ratio relative to the fuel flow rate and to keep the output of the power generator 5 as an instruction value.

Here, the gas turbine is generally designed to have most favorable efficiency with a maximum load, and thus, the efficiency of the compressor 1 is improved by opening the IGV 9. For example, the IGV 9 is opened when the GT control apparatus 7a increases the output by increasing the fuel and the M/G 6 decreases the high pressure turbine rotational speed by braking the compressor 1. Accordingly, the efficiency of the compressor 1 is improved, the temperature of the air discharged from the compressor 1 decreases, and the energy consumed by the compressor 1 decreases. Thus, the output increases due to the decrease the energy consumed by the compressor 1 in addition to the increase of the output due to the fuel increase. Further, the temperature of the combustion gas 22 decreases due to the decrease of the temperature of the discharged air, and thus, it is possible to reduce the increase amount of the temperature of the combustion gas 22 obtained by increasing the fuel and to improve the reliability. In contrast, the IGV 9 is closed when the GT control apparatus 7a decreases output by decreasing the fuel and the M/G 6 increases the high pressure turbine rotational speed by assisting the compressor 1. Accordingly, the compressor efficiency decreases, the temperature of the air discharged from the compressor 1 increases, and the energy consumed by the compressor 1 increases. Thus, the increase amount of the energy consumed by the compressor 1 also causes the decrease of the output in addition to the output decrease due to the fuel decrease. Further, the temperature of the combustion gas 22 increases due to the increase of the temperature of the discharged air, and thus, it is possible to reduce the decrease amount of the temperature of the combustion gas 22 by decreasing the fuel and to improve the reliability. It is possible to obtain the above-described advantageous synergy.

In addition, an operation point may be set in design of the compressor 1 such that the compressor efficiency increases when the high pressure turbine rotational speed decreases and the compressor efficiency decreases when the high pressure turbine rotational speed increases. In this manner, it is possible to obtain the same advantageous synergy as described above.

Hereinafter, a description will be given regarding a power generation system in which the two-shaft gas turbine power generation apparatus and a renewable energy generation apparatus are combined. Here, wind is used as the renewable energy.

Figure 3:
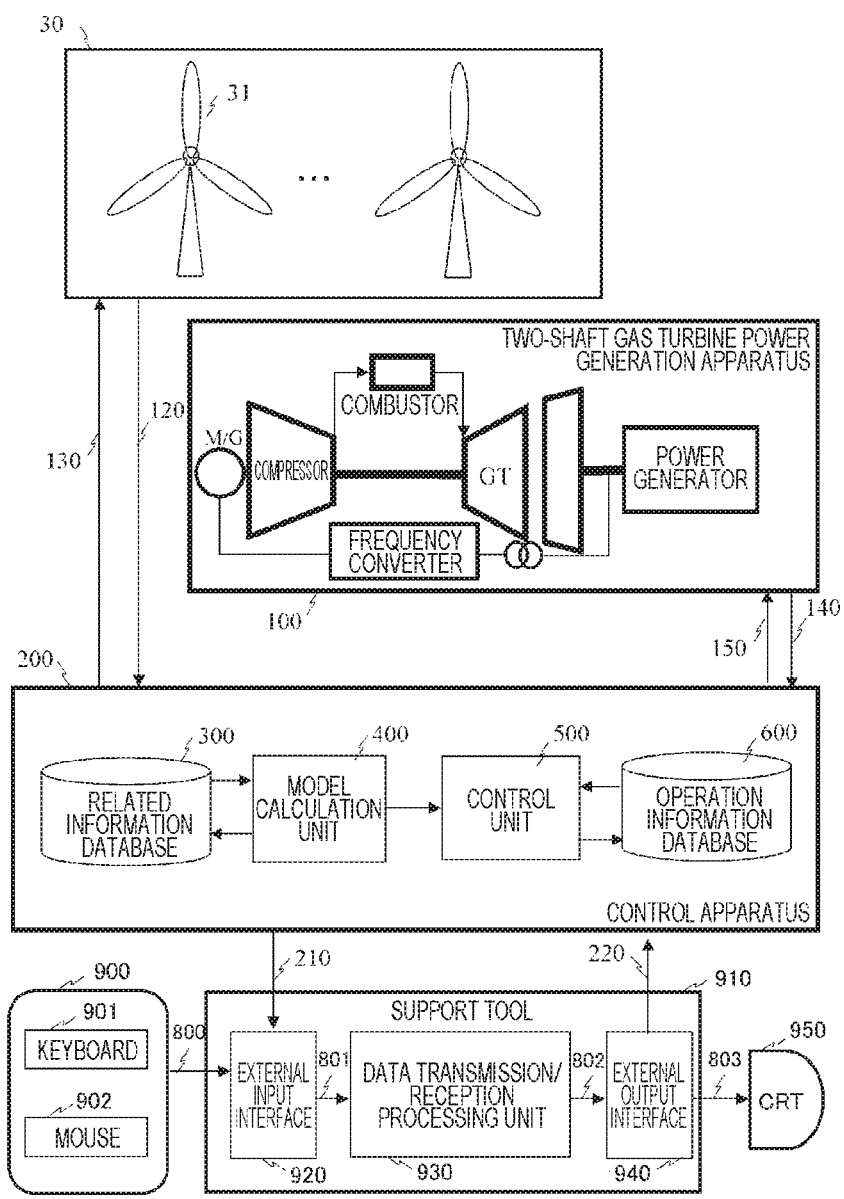
FIG. 3 illustrates a configuration of a power generation system of a first embodiment.

FIG. 3 illustrates a configuration of the power generation system of the first embodiment.

This power generation system includes a wind power generation apparatus 30, the two-shaft gas turbine power generation apparatus 100, a control apparatus 200, a support tool 910, an input device 900, and an image display device 950.

The wind power generation apparatus 30 is formed using a plurality of wind power generators 31. The wind power generation apparatus 30 includes an anemometer, configured to measure wind conditions, and controls a pitch of a blade or a direction (yaw) of a windmill according to the wind conditions. The wind power generation apparatus 30 generates power when receiving wind at a certain speed or higher, and changes the pitch and stops the operation such that the blade does not receive wind when the wind is strong. Characteristics of power generation output with respect to the wind speed depend on the design of the wind power generation apparatus 30. Information of the wind conditions obtained by the wind power generation apparatus 30, a measurement signal 120 necessary for control, and a control signal 130, configured to control, the wind power generation apparatus 30 are accumulated in the control apparatus 200.

The two-shaft gas turbine power generation apparatus 100 is controlled into a desired state by receiving the control signal 150 from the control apparatus 200. The control signal 150 (output instruction) includes the MWD for control of the combustor 20 and the IMWD for control of the frequency converter 10. Each state volume of the units of the two-shaft gas turbine power generation apparatus 100 is input to the control apparatus 200 as a measurement signal 140.

The control apparatus 200 operates various operation terminals to form a suitable operation state with respect to the power generation request based on the measurement signal 140 from the two-shaft gas turbine power generation apparatus 100.

A related information database 300 stores information to grasp prediction or current state of the wind power generation. An operation information database 600 stores the respective measurement signals 120 and 140 obtained from the wind power generation apparatus 30 and the two-shaft gas turbine power generation apparatus 100. Forms of these data will be described later in detail.

A model calculation unit 400 calculates a prediction value of wind power generation output which is the output of the wind power generation apparatus 30 on the basis of the information obtained from the measurement signals 120 and 140, and calculates an output value at the time of inputting a signal that offsets a variation in the wind power generation to the two-shaft gas turbine power generation apparatus 100. Here, examples of data necessary for calculation of the prediction value of the wind power generation output may include atmospheric air information such as temperature and humidity of outside air (atmospheric air), wind speed, the output of the wind power generator 31, and the like. Forms of these data will be described later in detail.

A control unit 500 receives a result of the model calculation unit 400 and calculates and outputs the suitable control signal 130. The amount of air and the fuel flow rate of the two-shaft gas turbine power generation apparatus 100 are operated on the basis of the control signal 130, and the output is controlled. In addition, the control signal of the frequency converter 10 has the similar function. The signal and information generated by the control apparatus 200 are also output to the support tool 910 if necessary. Algorithm to obtain the control signal 130 will be described later in detail.

A user such as an operator relating to the two-shaft gas turbine power generation apparatus 100 can view various types of information which relates to the two-shaft gas turbine power generation apparatus 100 using the support tool 910. The support tool 910 is connected to the input device 900 including the keyboard 901 and the mouse 902 and the image display device 950. In addition, the support tool 910 can access the information inside the control apparatus 200.

The support tool 910 includes an external input interface 920, a data transmission/reception processing unit 930, and an external output interface 940 The support tool 910 may be a computer including a memory and a microprocessor.

An input signal 800 generated by the input device 900 is input to the support tool 910 via the external input interface 920. In addition, the information from the control apparatus 200 is similarly input to the support tool 910 via the external input interface 920. The data transmission/reception processing unit 930 processes an input signal 801 received from the external input interface 920 and transmits the processed signal to the external output interface 940 as an output signal 802. The output signal 803 is displayed on the image display device 950.

Hereinafter, a description will be given regarding the measurement signal stored in the related information database 300 and the operation information database 600.

FIG. 4 illustrates content of the related information database 300.

The related information database 300 includes climate state information. The climate state information herein includes items relating to solar power generation as well as items relating to the wind power generation. The climate state information is the information which is measured by the external sensor or the wind power generation apparatus 30 on a regular basis, and includes entry for each time. The entry at a certain time includes time, weather, temperature, a wind direction, wind speed, humidity, and the amount of solar radiation. A period of time is determined based on a measurable time width. The weather is indicated by 15 kinds of weather conditions that have been announced to the public by Japan Meteorological Agency. As to the wind direction, 16 directions are usually used in Japan, but, 360 directions by scaling 360 degrees in a clockwise direction from due North, which is the reference direction, are used according to the international standard. In the drawing, the direction is indicated in 360 directions, but may also be indicated in 16 directions by multiplying each direction by 22.5 degrees to obtain degrees in numerical form in the same manner.

The related information database 300 also stores other information, such as design information of the wind power generation apparatus 30, design information of the two-shaft gas turbine power generation apparatus 100, and information of regulations and rules of a system to be connected.

FIG. 5 illustrates content of the operation information database 600.

The operation information database 600 stores the information measured by the wind power generation apparatus 30 and the two-shaft gas turbine power generation apparatus 100 on a regular basis for each measured time. Each entry at each time includes items of the respective measurement values. A PID number is a unique number which is allocated to each measurement value to enable the data stored in the operation information database 600 to be easily utilized. An alphabet below the PID number is a symbol indicating a target to be measured. For example, a flow rate value F, a temperature value T, a pressure value P, a power generation output value E, and a concentration value D. Incidentally, data is stored every one second in the example of this drawing, a sampling period for data collection differs depending on the two-shaft gas turbine power generation apparatus 100 serving as the target. Examples of the temperature value T may include the atmospheric temperature, the exhaust temperature, the transformer coolant temperature, and the like.

Next, the model calculation unit 400 of the control apparatus 200 will be described.

The model calculation unit 400 creates a wind power generation model to obtain future output of the wind power generation output based on the wind conditions and current output of the wind power generation, and calculates output of the wind power generation model as a renewable energy output prediction value by inputting the measurement value into the wind power generation model.

Figure 6:
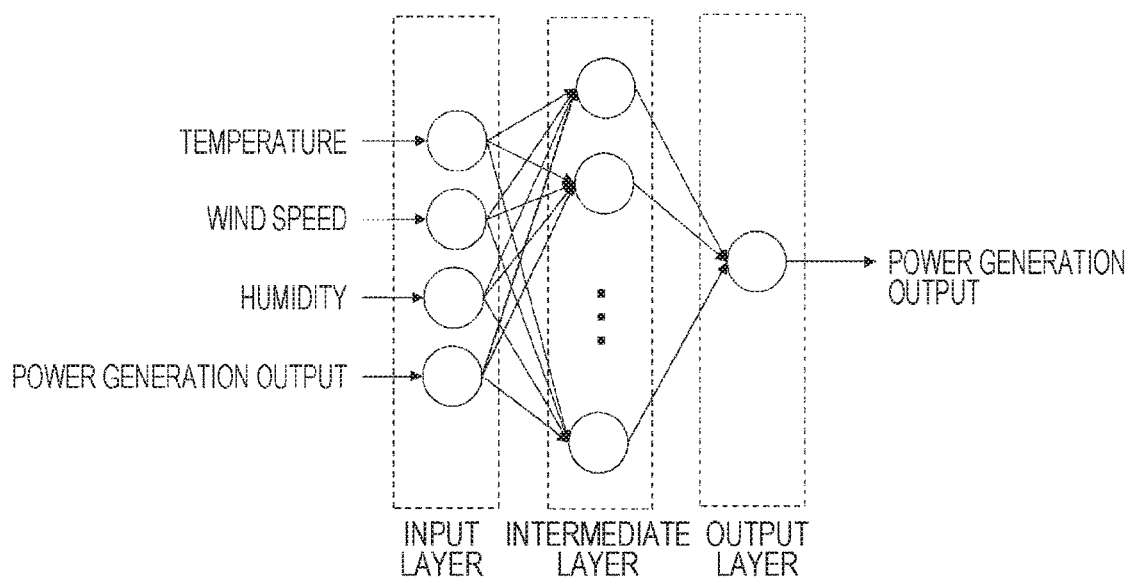
FIG. 6 illustrates a configuration of a windpower generation model.

FIG. 6 illustrates a configuration of the wind power generation model.

The model includes an input layer, an intermediate layer, and an output layer, and each of the layers includes a plurality of nodes. The nodes are linked with each other from the input layer toward the output layer, and weighting factors indicating the strength of the link are set. That is, the weighting factors exist as much as the number of connections among the nodes. This model is called a neural network which simulates a cerebral nerve network of a human. When an input value is input to the wind power generation model and the weighting factor is adjusted so as to output a desired output value corresponding to the input value, a correlation relationship of the input value can be expressed as a model. This adjustment is called learning. For example, when a certain time stored in the operation information database 600 is set to a target time of the learning, input values may include temperature, wind speed, and humidity stored in the related information database 300, and the output of the wind power generation apparatus 30 stored in the operation information database 600 of the past than the target time, and an output value is the output of the wind power generation apparatus 30 at the target time. When the learning is completed, it is possible to estimate the output value based on the correlation relationship of the input value at the time by inputting the input value to the wind power generation model. Generally, an exponential function called a sigmoid function is used as a function to set each node, but the function is not limited thereto. In addition, many algorithms have been devised for suitably adjusting the weighting factors during learning. In general, a back-propagation method is used.

Therefore, the model calculation unit 400 learns a parameter inside the wind power generation model on the basis of the data or the design data accumulated in the past for construction of the wind power generation model. After starting the operation, the model calculation unit 400 performs prediction based on the parameter obtained by the learning, and performs learning again on the basis of the data having been accumulated so far to construct the wind power generation model when a difference between a prediction value and an actual measurement value becomes larger than a setting value set in advance.

In addition, it is determined whether individual wind power models are generated for the respective wind power generators 31, or one model may be collectively generated for the wind power generation apparatus 30 (wind firm) according to a mode to be applied.

Incidentally a prediction time, which is a length of target time for calculation of the prediction value, is determined according to a characteristic of the power generation output of the two-shaft gas turbine power generation apparatus 100. That is, it is necessary to predict in advance a delay until the output of the two-shaft gas turbine power generation apparatus 100 becomes actually equal to the MWD from the input of the MWD into the two-shaft gas turbine power generation apparatus 100. This will be described later.

Further, the model calculation unit 400 predicts the output of the two-shaft gas turbine power generation apparatus 100 by inputting an output target value and the measurement value into a gas turbine model using the gas turbine model which represents the two-shaft gas turbine power generation apparatus 100 as the MWD toward the two-shaft gas turbine power generation apparatus 100.

The gas turbine model is set in advance in the model calculation unit 400. A dynamic characteristic model based on a mass balance of the pressure or the flow rate is generally used as the gas turbine model, but the modelling based on the neural network can be also used similarly to the creation of the wind power generation model can also be used.

The amount of power to be supplied from the two-shaft gas turbine power generation apparatus 100 is equivalent to the output that offsets the wind power generation output, that is, the output obtained by subtracting the wind power generation output from a system output target value (total output target value) which is a target of the output of the power generation system. This value is called a gas turbine output target value which is the output target value of the two-shaft gas turbine power generation apparatus 100. Meanwhile, the two-shaft gas turbine power generation apparatus 100 that does not employ the M/G 6 includes the delay due to mechanical elements, and thus, the output of the power generator 5 may be delayed relative to a change of the MWD to be input. Thus, the sum of the output of the wind power generation apparatus 30 and the output of the two-shaft gas turbine power generation apparatus 100 that does not employ the M/G 6 does not match the system output target value, and a difference (leakage) is generated in some cases. The model calculation unit 400 calculates the output of the power generator 5 when the system output target value is input to the two-shaft gas turbine power generation apparatus 100, which does not employ the M/G 6, as the MWD using the gas turbine model. A maximum load change rate of the two-shaft gas turbine power generation apparatus 100, which does not employ the M/G 6, may be set in the gas turbine model. In this case, the gas turbine model behaves to track the system output instruction value within the maximum load change rate. The control unit 500 sets the output of the gas turbine model as the MWD toward the two-shaft gas turbine power generation apparatus 100 and sets the difference that is hardly tracked by the gas turbine model as the IMWD to be input to the frequency converter 10.

Incidentally, the gas turbine model may use a transfer function which has a lighter calculation load than the dynamic characteristic model when the time to respond the power generation request is short in relation to the time required for calculation of the respective steps of the control unit 500. The transfer function in this case considers a first-order lag or a dead time so as to be capable of simulating the mechanical delay of the gas turbine.

Next, gas turbine control processing in which the control unit 500 controls the two-shaft gas turbine power generation apparatus 100 will be described.

Figure 7:
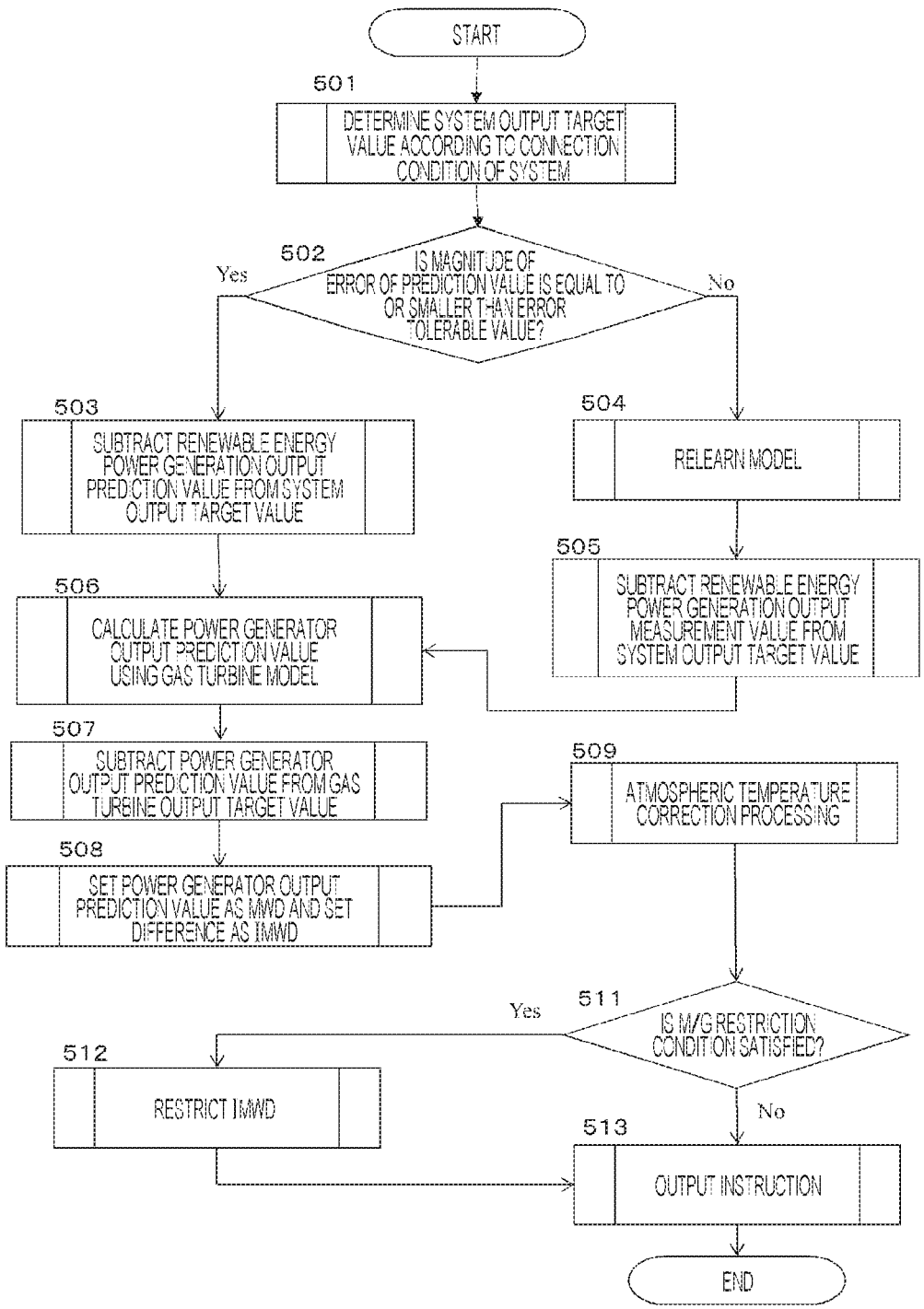
FIG. 7 illustrates gas turbine control processing.

FIG. 7 illustrates the gas turbine control processing.

In step 501, the control unit 500 determines the system output target value according to the connection condition of the system. The connection condition of the system indicates a condition for the power generation system to be connected (linked) to the system, and differs depending on countries and region. A lot of connection conditions define a load variation tolerable width and a frequency variation tolerable width. If some power supplies other than the power generation system of the present embodiment are connected in a system, a variation in frequency can be absorbed by the system even if the output of the two-shaft gas turbine power generation apparatus 100 is rapidly changed. Thus, the control unit 500 calculates the system output target value based on the load variation tolerable width. On the other hand, when only a few power supplies are connected to the systems as represented by an island operation, the low pressure turbine rotational speed changes and gives an influence to the system frequency if the output of the two-shaft gas turbine power generation apparatus 100 is rapidly changed. Therefore, it is necessary to determine a load change rate in advance such that the frequency variation fits within the frequency variation tolerable width, and to change the output of the two-shaft gas turbine power generation apparatus 100 at the load change rate or lower. Incidentally, the system output target value may be a power supply instruction value which is issued from a central power supply instructing office and instructs the output of the power generation system.

In step 502, the control unit 500 acquires the renewable energy output prediction value obtained from the model calculation unit 400 and a renewable energy output measurement value, which is a current measurement value of the output of the wind power generation apparatus 30 obtained from the operation information database 600, calculates an error by subtracting the renewable energy output measurement value from the renewable energy output prediction value, and determines whether a magnitude of the error is equal to or smaller than the error tolerable value set in advance.

When the magnitude of the error is the error tolerable value or smaller (Yes), the control unit 500 causes the process to transition to step 503. In the opposite case (No), the control unit 500 causes the process to transition to step 504.

In step 503, the control unit 500 calculates the gas turbine output target value by subtracting the wind power generation output prediction value from the system output target value, and then, causes the process to transition to step 506. Accordingly, the two-shaft gas turbine power generation apparatus 100 can absorb the variation in output of the renewable energy generation apparatus such as the wind power generation apparatus 30. Incidentally, the control unit 500 may calculate a prediction value of a variation in power supply and demand of the system on the basis of the demand for power in the power system of the system and information relating to other power generators and calculate the gas turbine output target value on the basis of the prediction value of the variation in power supply and demand instead of the model calculation unit 400 that calculates the renewable energy output prediction value. Accordingly, it is possible to predict the variation in power supply and demand using the information acquired from the outside and to calculate the gas turbine output target value.

In step 504, the control unit 500 learns the wind power generation model again. Thereafter, the control unit 500 calculates the gas turbine output target value by subtracting the renewable energy output measurement value from the system output target value in step 505, and then, causes the process to transition to step 506. That is, the control unit 500 does not use the renewable energy output prediction value in this case.

In step 506, the control unit 500 calculates a power generator output prediction value by inputting the gas turbine output target value to the model calculation unit 400. Here, the model calculation unit 400 calculates the power generator output prediction value by inputting the gas turbine output target value and the measurement value to the gas turbine model.

Thereafter, the control unit 500 calculates an output difference value by subtracting the power generator output prediction value from the gas turbine output target value in step 507. Thereafter, the control unit 500 sets the power generator output prediction value to the MWD and sets the output difference value to the IMWD in step 508. Accordingly, it is possible to allocate a portion, which is predicted to be hardly tracked by the control of the combustor 20 using the MWD, of the gas turbine output target value to the control of the frequency converter 10 using the IMWD Thereafter, the control unit 500 performs atmospheric temperature correction processing to correct the IMWD on the basis of the atmospheric temperature in step 509.

Here, the atmospheric temperature correction processing will be described.

Figure 8:
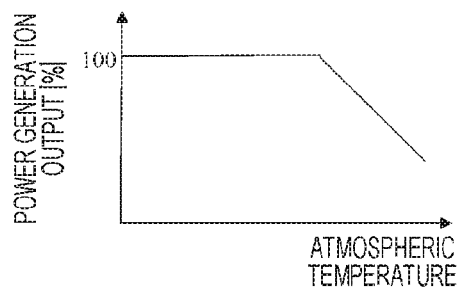
FIG. 8 illustrates a relationship between atmospheric temperature and power generation output when an M/G 6 is not employed.

FIG. 8 illustrates a relationship between the atmospheric temperature and the power generation output when the M/G 6 is not employed.

When the atmospheric temperature increases, a mass flow rate of the compressed air 21 input from the compressor 1 decreases, and thus, the mass flow rate of the compressed air 21 is insufficient relative to a mass flow rate of the fuel set according to the MWD, and the power generation output decreases. This characteristic is a basic characteristic of the gas turbine. The power generation output reaches 100% (rated) until the atmospheric temperature reaches a certain design temperature (atmospheric temperature threshold), but the output decreases as the atmospheric temperature increases exceeding the design temperature.

In the two-shaft gas turbine power generation apparatus 100 according to the present embodiment, the M/G 6 connected to the compressor 1 functions as an electric motor by being supplied with electric energy from the frequency converter 10, and functions as the power generator by receiving the kinetic energy of the compressor 1 and outputting the electric energy to the frequency converter 10. It is possible to improve the output even when the atmospheric temperature is higher than the design temperature as the M/G 6, supplied with electricity from the frequency converter 10, assists the compressor 1. Hereinafter, the power input from the frequency converter 10 to the M/G 6 will be referred to as M/G input. Here, the IMWD represents the power to be output from the M/G 6 to the frequency converter 10, and thus, a sign of the M/G input is opposite to a sign of the IMWD.

Figure 9:
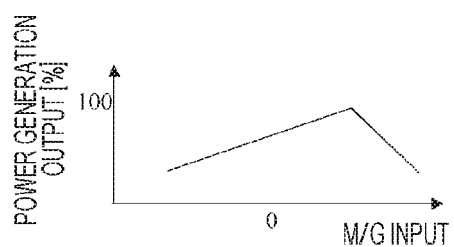
FIG. 9 illustrates a relationship between M/G input and the power generation output.

FIG. 9 illustrates a relationship between the M/G input and the power generation output.

Here, it is assumed that the atmospheric temperature is higher than the design temperature, and the M/G input is zero, that is, the power generation output is lower than 100%. Here, when the electric energy is input to the M/G 6 by increasing the M/G input, the kinetic energy of the compressor 1 is increased by the M/G 6, and it is possible to increase the amount of air suctioned by the compressor even if the opening degree of the IGV is completely opened, for example. Thus, the mass flow rate of the compressed air 21 increases, and the compressed air 21 reacting to the mass flow rate of the fuel set according to the MWD increases, and it is possible to increase the output of the power generator 5. However, it is difficult to infinitely increase the output of the power generator 5, and the combustion temperature increases as the reacting fuel increases along with the increase of the compressed air 21, and the output of the power generator 5 conversely decreases as the fuel is throttled when the exhaust temperature reaches an exhaust temperature limit value set in advance. That is, there is a limit in the M/G input.

Figure 10:
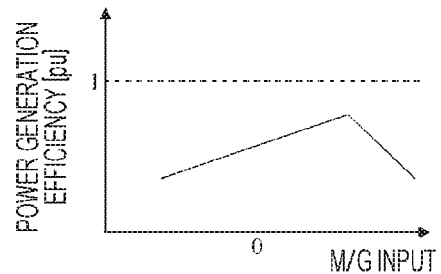
FIG. 10 illustrates a relationship between the M/G input and power generation efficiency.

FIG. 10 illustrates a relationship between the M/G input and the power generation efficiency.

The same description as for the power generation output is applied to the power generation efficiency. When the two-shaft gas turbine power generation apparatus 100 is operated with a partial load other than the rated load, the efficiency decreases. It is because the compressor 1 is designed to have the most favorable efficiency at the rated point. When the atmospheric temperature is higher than the design temperature and the M/G input is zero, the operation point of the compressor 1 approximates to the rated point when the electric energy is input to the M/G 6 by increasing the M/G input, and thus, the efficiency of the compressor 1 increases.

In the atmospheric temperature correction processing, the control unit 500 determines the M/G input (assist amount) so as to obtain an optimal atmospheric temperature state and an optimal partial load state when the atmospheric temperature is higher than a setting temperature, and corrects the IMWD by subtracting the M/G input from the IMWD. To be specific, the control unit 500 determines the M/G input such that a total value of an increase amount of the power generation output and an increase amount of the power generation efficiency relative to the increase of the M/G input becomes the maximum. However, it is not limited to the total value. The control unit 500 may select the M/G input such that at least one of the increase amount of the power generation output and the increase amount of the power generation efficiency becomes the maximum. In addition, the control unit 500 may set a value obtained by inverting the sign of the M/G input to the IMWD without using the IMWD set in step 508 when the atmospheric temperature is higher than the design temperature. As the high pressure turbine shaft 12a is accelerated with the M/G 6 and the flow rate of the compressed air 21 is increased, the output of the power generator 5 can approximate to the MWD when the atmospheric temperature is higher than the design temperature.

The atmospheric temperature correction processing has been described as above.

Thereafter, the control unit 500 determines whether a state of the two-shaft gas turbine power generation apparatus 100 satisfies the M/G limit condition (frequency converter limit condition) set in advance in step 511. The M/G limit condition is, for example, a case in which the IMWD is outside an IMWD limit range or a case in which coolant temperature of the transformer 50 exceeds a coolant temperature limit value. When it is determined in step 511 that the state of the two-shaft gas turbine power generation apparatus 100 does not satisfy the M/G limit condition (No), the control unit 500 outputs an output instruction including the MWD and the IMWD to the two-shaft gas turbine power generation apparatus 100 in step 513, and ends this flow. On the other hand, when it is determined in step 511 that the state of the two-shaft gas turbine power generation apparatus 100 satisfies the M/G limit condition (Yes), the control unit 500 restricts the IMWD in step 512, and causes the process to transition to step 511.

When the M/G 6 increases or decreases a torque of the compressor 1 depending on the assist amount (when the M/G 6 operates as the electric motor) using the IMWD or a braking amount (when the M/G 6 operates as the power generator), the IMWD limit range (instruction value range) is present. For example, when the atmospheric temperature is high, the kinetic energy of the compressor 1 increases by increasing the M/G input, and the increase of the fuel becomes possible as the amount of intake air increases, thereby increasing the output as described above. The output does not necessarily increase without limitation when the M/G input is infinitely increased. The gas turbine inlet temperature and the exhaust temperature increase in proportion to the fuel input amount, and the exhaust temperature reaches the exhaust temperature limit value. The IMWD at this time is set as a lower limit value of the IMWD limit range. The same description may be applied to the braking amount, and the amount of intake air decreases due to braking, and the gas turbine inlet temperature or the exhaust temperature is likely to increase. Therefore, when the IMWD is increased, the exhaust temperature reaches the exhaust temperature limit value. The IMWD at this time is set as an upper limit value of the IMWD limit range.

Each of magnitude of the upper limit value and the lower limit value of the IMWD limit range is desirably equal to or smaller than 10% of the rated output of the power generator 5. Further, there is a considerable difference between voltage of the power generator 5 and voltage of the frequency converter 10, and thus, it is necessary to provide the transformer 50 between the power generator 5 and the frequency converter 10. A main power generator and an inverter device are not connected to each other via a transformer in a technique of PTL 3, and thus, it is difficult to apply the technique to an application for a case in which a voltage gap is caused. The volume of the frequency converter is desirably equal to or smaller than 10% of the rated output of the gas turbine power generation apparatus in the gas turbine power generation apparatus, particularly, the gas turbine power generation apparatus having several tens of MW or more. It is because there is a risk that the gas turbine inlet temperature becomes equal to or higher than the limit value with the input equal to or higher than the volume.

When the IMWD exceeds the upper limit value of the IMWD limit range in step 511, the control unit 500 changes the IMWD to the upper limit value of the IMWD limit range in step 512. When the IMWD is below the lower limit value of the IMWD limit range in step 511, the control unit 500 changes the IMWD to the lower limit value of the IMWD limit range in step 512.

In addition, when it is determined in step 511 that the coolant temperature exceeds an upper limit value of the coolant temperature, the control unit 500 sets the IMWD to zero to stop the operations of the M/G 6, the frequency converter 10, and the transformer 50 in step 512. Accordingly, the control unit 500 performs control such that current does not flow to the transformer 50 until the coolant temperature becomes the coolant temperature limit value or lower.

In the present embodiment, the output of the two-shaft gas turbine power generation apparatus 100 tracks the gas turbine output target value at high speed using the M/G 6, and thus, power is input to and output from the frequency converter 10 within a short period of time. Thus, each voltage to be applied to both ends of the transformer 50, which is provided between the frequency converter 10 and the system, rapidly changes. Accordingly, the coolant temperature of the transformer 50 rapidly changes, and thus, a state quantity of the transformer 50 such as the coolant temperature is constantly monitored and the condition of the coolant temperature is included in the M/G limit condition.

Incidentally, the order of processes in the gas turbine control processing can be interchanged. For example, steps 507 and 508, and step 509 can be interchanged.

Incidentally, the control unit 500 may limit the power generator output prediction value on the basis of the state of the two-shaft gas turbine power generation apparatus 100, and set the limit value as the MWD.

The gas turbine control processing has been described as above. When the MWD is smaller than the gas turbine output target value (when the IMWD is positive), the frequency converter 10 performs frequency-conversion of the output of the M/G 6 on the basis of the instruction from the control apparatus 200 and outputs the result to the system, accordingly, the M/G 6 outputs power obtained by decelerating the high pressure turbine shaft 12a to the frequency converter 10, and the transformer 50 boosts the output of the frequency converter 10 and outputs the result to the system. When the MWD is larger than the gas turbine output target value (when the IMWD is negative), the frequency converter 10 performs frequency-conversion of a part of the output of the power generator 5 on the basis of the instruction from the control apparatus 200 and outputs the result to the M/G 6, accordingly, the transformer 50 steps down the part of the output of the power generator 5 and outputs the result to the frequency converter 10, and the M/G 6 accelerates the high pressure turbine shaft 12a using the output of the frequency converter 10. Accordingly, it is possible to make the output of the two-shaft gas turbine power generation apparatus 100 track the demand variation of the system or the output variation of the renewable energy generation apparatus at high speed. In addition, it is possible to reflect the delay of the output of the power generator 5 caused by the control of the combustor 20 in the control and to suitably allocate the gas turbine output target value into the power generator 5 and the M/G 6 by calculating the output prediction value of the power generator 5 in the case of controlling the combustor 50 so as to match the output of the power generator 5 to the gas turbine output target value using the dynamic characteristic model, which simulates the dynamic characteristic of the two-shaft gas turbine power generation apparatus 100, and calculating the MWD and the IMWD on the basis of the gas turbine output target value and the output prediction value of the power generator 5. In addition, it is possible to prevent an excessive increase of the gas turbine inlet temperature suppressing the output of the M/G 6 to be lower than the output of the power generator 5 using the transformer 50, and to improve the reliability of the two-shaft gas turbine power generation apparatus 100.

When it is determined that the control apparatus 200 satisfies the M/G limit condition, it is possible to improve the reliability of the two-shaft gas turbine power generation apparatus 100 by limiting the operation of the frequency converter 10. In particular, when it is determined that the coolant temperature exceeds the coolant temperature limit value, it is possible to prevent an excessive increase of the coolant temperature of the transformer 50 by stopping the operation of the frequency converter 10. In addition, when it is determined that the IMWD is outside the IMWD limit range, it is possible to prevent an excessive increase of the gas turbine inlet temperature by changing the IMWD to a value within the IMWD limit range.

Hereinafter, a description will be given regarding a case in which the model calculation unit 400 does not use a wind power generation model and a renewable energy output prediction value as a modified example of the gas turbine control processing.

Figure 11:
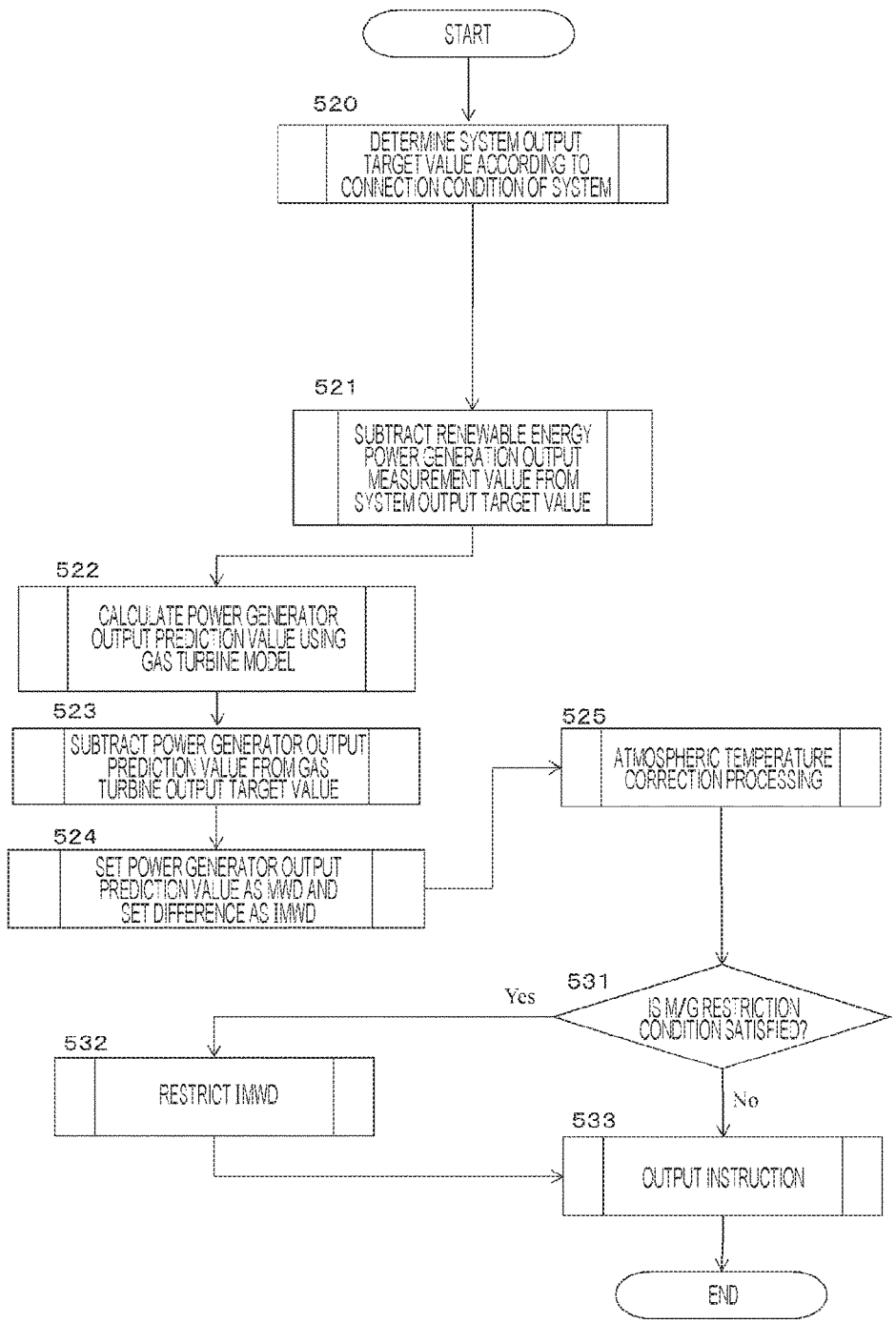
FIG. 11 illustrates a modified example of the gas turbine control processing.

FIG. 11 illustrates the modified example of the gas turbine control processing.

In step 520, the control unit 500 generates a system output target value according to a connection condition of a system. Thereafter, the control unit 500 calculates a gas turbine output target value by subtracting a renewable energy output measurement value from the system output target value in step 521.

Thereafter, the control unit 500 executes steps 522 to 533 which are the same as steps 506 to 513 described above.

The modified example of the gas turbine control processing has been described as above.

Hereinafter, display using the support tool 910 will be described.

An operator of the power generation system can monitor a state of the power generation system using the support tool 910. The support tool 910 displays a screen indicating each information of the measurement signal 120, the control signal 130, the related information database 300, the setting value, and the operation information database 600 on the image display device 950. The operator performs an operation by inputting a parameter value into an input field inside the screen or the like using the keyboard 901 and the mouse 902.

Figure 12:
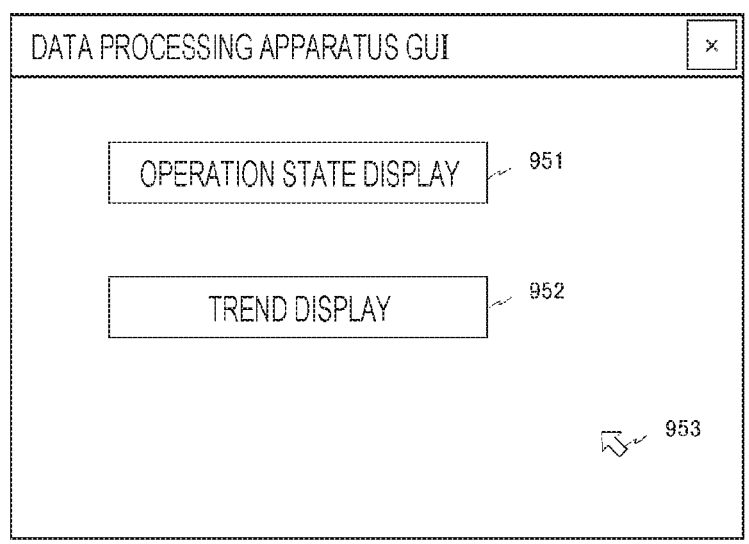
FIG. 12 illustrates an initial screen.

FIG. 12 illustrates an initial screen.

The initial screen includes an operation state display button 951 and a trend display button 952. The operator selects a necessary button between the operation state display button 951 and the trend display button 952, moves a cursor 953 using the mouse 902 and clicks the mouse 902 to cause a desired screen to be displayed. When the operation state display button 951 is clicked, the data transmission/reception processing unit 930 displays an operation state display screen on the image display device 950. When the trend display button 952 is clicked, the data transmission/reception processing unit 930 displays a trend display setting screen on the image display device 950.

Figure 13:
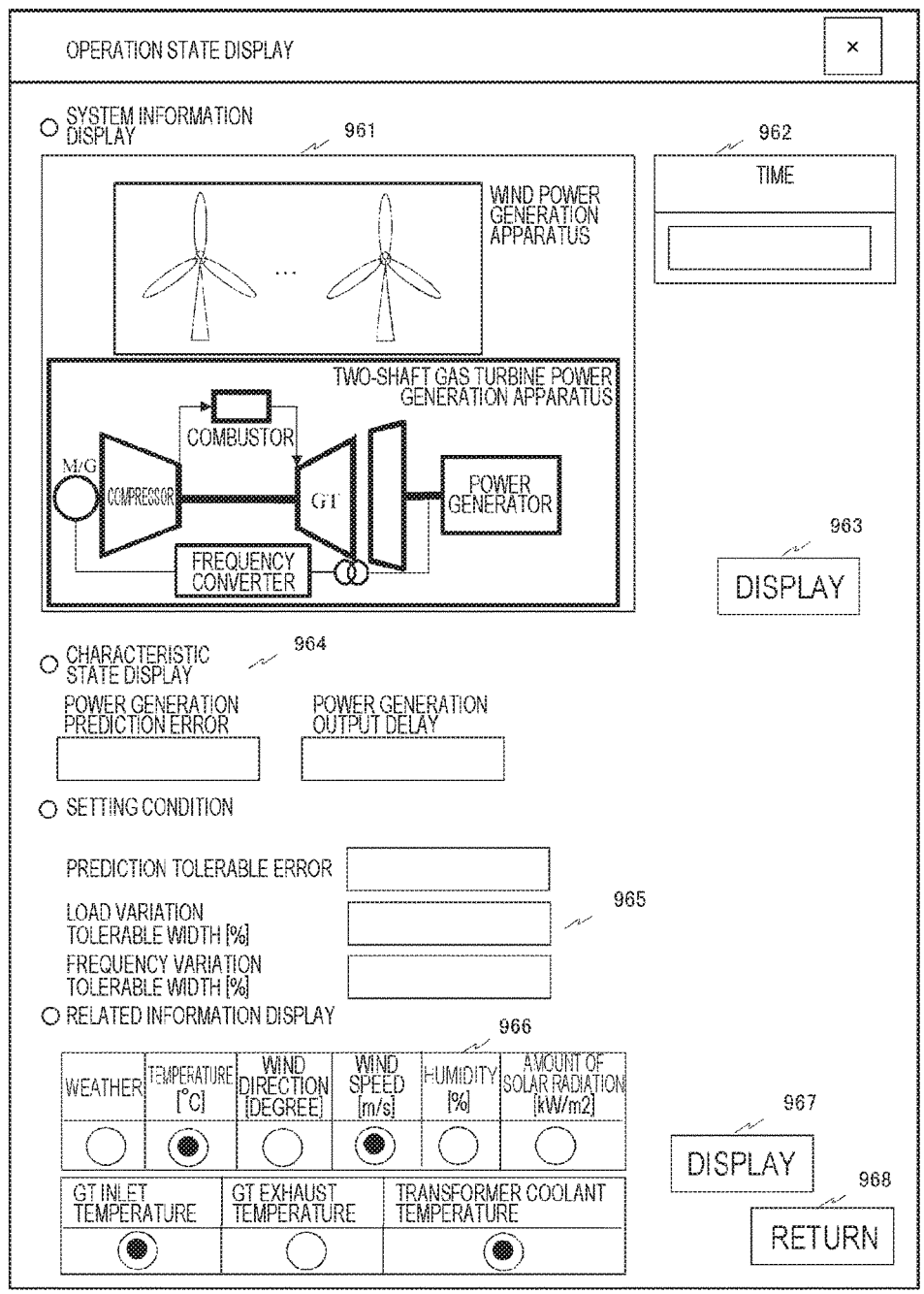
FIG. 13 illustrates an operation state display screen.

FIG. 13 illustrates the operation state display screen.

The operation state display screen includes a system information display field 961, a time input field 962, a display button 963, a characteristic state display field 964, a setting condition display field 965, a related information display field 966, a display button 967, and a return button 968.

When the operator clicks the return button 968 on the operation state display screen, the data transmission/reception processing unit 930 displays the initial screen on the image display device 950.

The system information display field 961 illustrates a system diagram of the power generation system. When the operator inputs time of information to be displayed on the image display device 950 into the time input field 962 and clicks the display button 963, the data transmission/reception processing unit 930 displays a designated time state on each section inside the system information display field 961. To be specific, the system information display field 961 displays the state quantity such as the temperature and the pressure of the location to be currently measured in a corresponding portion inside the system diagram.

The characteristic state display field 964 displays a power generation prediction error or a characteristic state of the power generation output delay or the like which are calculated on the basis of the value obtained by the gas turbine control processing. The control unit 500 calculates the power generation prediction error by subtracting an actually measured value from the output prediction value of the power generation system. In addition, the control unit 500 compares the gas turbine output target value and the measurement value of the output of the two-shaft gas turbine power generation apparatus 100 to calculate a time until the time at which the output of the two-shaft gas turbine power generation apparatus 100 reaches the gas turbine output target value from the time of transmitting the output instruction to the two-shaft gas turbine power generation apparatus 100 as the power generation output delay on the basis of the gas turbine output target value.

The setting condition display field 965 displays various setting conditions of the gas turbine control processing. Examples of the setting conditions may include a prediction tolerable error, the load variation tolerable width [%], and the frequency variation tolerable width [%] described above. The setting condition may include the IWMD limit range or the like.

The related information display field 966 illustrates choices of items such as the weather, the temperature, the wind direction, the wind speed, the humidity, the amount of solar radiation, and the like. When the operator selects an item that is desired to be displayed among the items illustrated in the related information display field 966 and clicks the display button 967, the data transmission/reception processing unit 930 retrieves information of the selected item from the related information database 300 and causes the information to be displayed on the image display device 950. In addition, when the operator selects an item that is desired to be displayed among limited items of the gas turbine (GT) inlet temperature, the GT exhaust temperature, and the transformer coolant temperature and clicks the display button 967, the data transmission/reception processing unit 930 retrieves information of the selected item from the operation information database 600 and causes the information to be displayed on the image display device 950. Incidentally, when it is difficult to measure the GT inlet temperature, the control unit 500 may estimate the GT inlet temperature on the basis of the GT exhaust temperature.

FIG. 14 illustrates the trend display setting screen.

The trend display setting screen includes a measurement signal display field 981, a time input field 982, a display button 983, a related information display field 984, a time input field 985, a display button 986, and a return button 989.

When the operator clicks the return button 989 on the trend display setting screen, the data transmission/reception processing unit 930 displays the initial screen on the image display device 950.

The operator selects a measurement signal or an operation signal that is desired to be displayed on the image display device 950 in the measurement signal display field 981, and inputs a range (upper limit/lower limit) of values of the selected signal. Examples of the signal may include the system output target value, the renewable energy output prediction value, the renewable energy output measurement value, the gas turbine output target value, the MWD, the IMWD, the FFD, the output of the power generator 5, the output of the M/G 6, and the output of the two-shaft gas turbine power generation apparatus 100. Further, the operator inputs a range of time of the selected signal into the time input field 982. Thereafter, when the operator clicks the display button 983, the data transmission/reception processing unit 930 retrieves the selected signal from the related information database 300 and causes the trend graph display screen including a trend graph of the obtained signal to be displayed on the image display device 950.

The related information display field 984 illustrates the same items as those of the related information display field 966 as choices. When the operator selects an arbitrary item among the weather, temperature, the wind direction, the wind speed, the humidity, and the amount of solar radiation in the related information display field 984, inputs the time range in the time input field 985, and clicks the display button 986, the data transmission/reception processing unit 930 retrieves information of the selected item from the related information database 300, and causes the trend graph display screen including the obtained information to be displayed on the image display device 950. Incidentally, a trend graph regarding the weather is indicated by the 15 kinds of weather conditions that have been announced to the public by Japan Meteorological Agency as described above. The data transmission/reception processing unit 930 assigns a number to each kind and obtains the trend graph using the number. That is, the data transmission/reception processing unit 930 sequentially assigns numbers up to 14 in such a manner that 0 indicates very fine, 1 indicates fine, 2 indicates a bit cloudy, and the like.

Further, when the operator selects an arbitrary item among the limited items of the GT inlet temperature, the GT exhaust temperature, and the transformer coolant temperature in the related information display field 984, inputs the time range into the time input field 985, and clicks the display button 986, the data transmission/reception processing unit 930 retrieves information of the selected item from the related information database 300 and causes the trend graph display screen including the obtained information to be displayed on the image display device 950.

Figure 15:
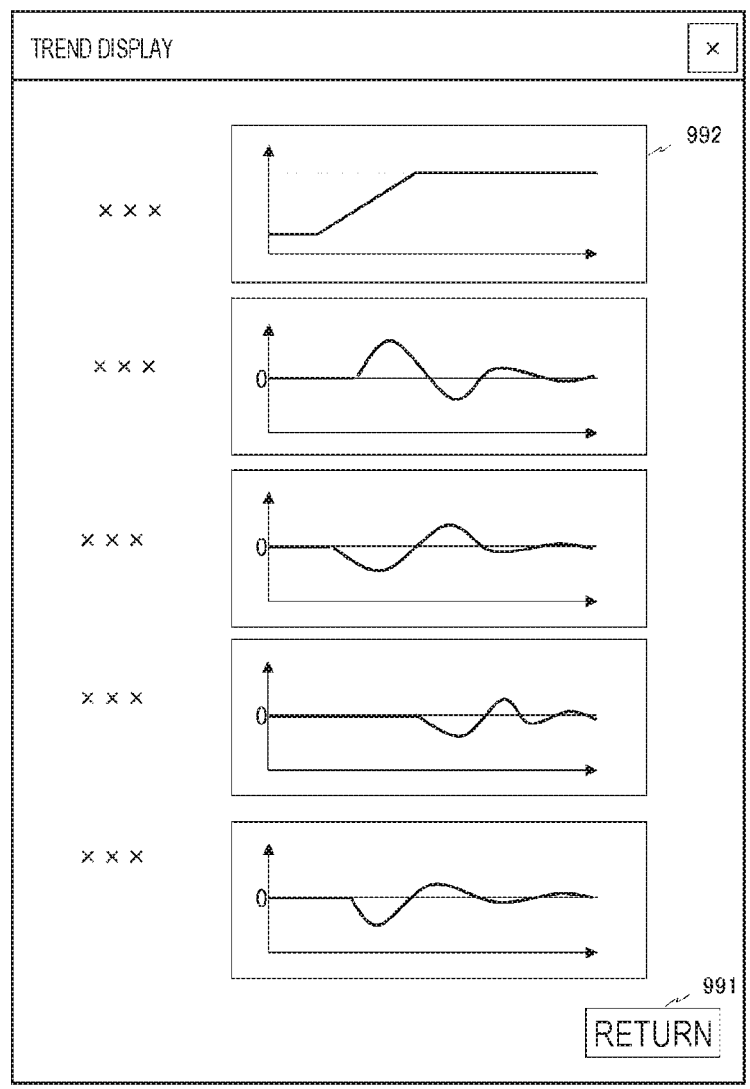
FIG. 15 illustrates a trend graph screen.

FIG. 15 illustrates the trend graph screen.

The trend graph screen includes a trend graph 992 for each item selected on the trend display setting screen and a return button 991. A range of the horizontal axis of the trend graph 992 is the time range designated on the trend display setting screen. A range of the vertical axis of the trend graph 992 is a range designated on the trend display setting screen. For example, the trend graph 992 may display a temporal change of the measurement value, the gas turbine output target value, and the like of the output of the two-shaft gas turbine power generation apparatus 100 or may display a trend graph obtained by comparison thereof.

When the operator clicks the return button 991, the data transmission/reception processing unit 930 displays the trend display setting screen on the image display device 950.

According to the support tool 910, the operator can monitor the state of the power generation system depending on the environment, the climate and the like. In addition, when the support tool 910 displays the gas turbine output target value, the gas turbine output measurement value, which is the measurement value of the output of the two-shaft gas turbine power generation apparatus 100, and the comparison result between the gas turbine output measurement value and the gas turbine output target value on the image display device 950, the operator can monitor whether the two-shaft gas turbine power generation apparatus 100 tracks the demand. In addition, when the support tool 910 displays the coolant temperature or the like on the image display device 950, it is possible to monitor an abnormality caused by the operation of the M/G 6.

Second Embodiment

In the present embodiment, a power generation system which uses solar power generation as renewable energy will be described. In the present embodiment, a difference from the first embodiment will be described.

Figure 16:
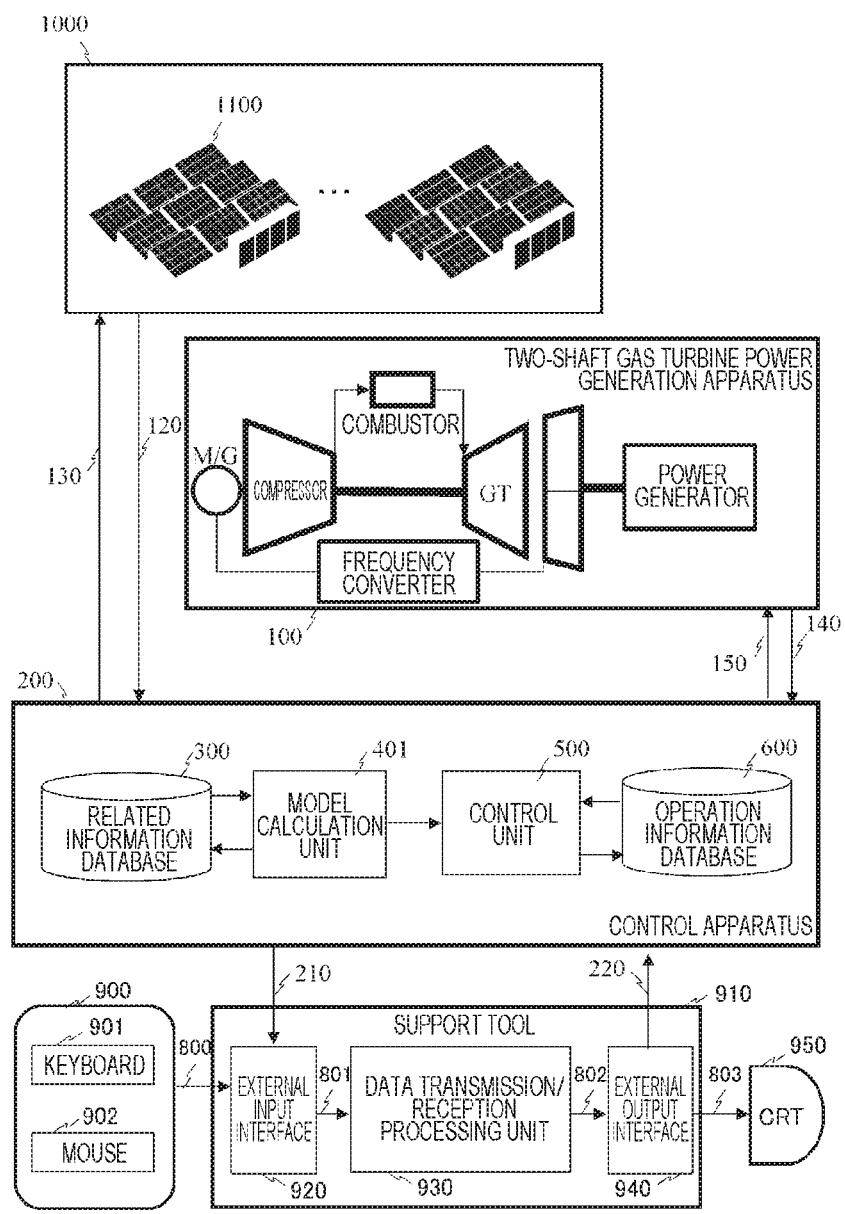
FIG. 16 illustrates a configuration of a power generation system of a second embodiment.

FIG. 16 illustrates a configuration of the power generation system of a second embodiment.

When compared with the power generation system of the first embodiment, the power generation system of the present embodiment includes a solar power generation apparatus 1000 instead of the wind power generation apparatus 30 as a renewable energy generation apparatus. The solar power generation apparatus 1000 is obtained by combining a plurality of solar panels 1100. The control apparatus 200 of the present embodiment includes a model calculation unit 401 which predicts output of the solar power generation apparatus 1000 using a solar power generation model, which is a model of the solar power generation apparatus 1000, instead of the model calculation unit 400 and sets the predicted value as a renewable energy output prediction value.

Figure 17:
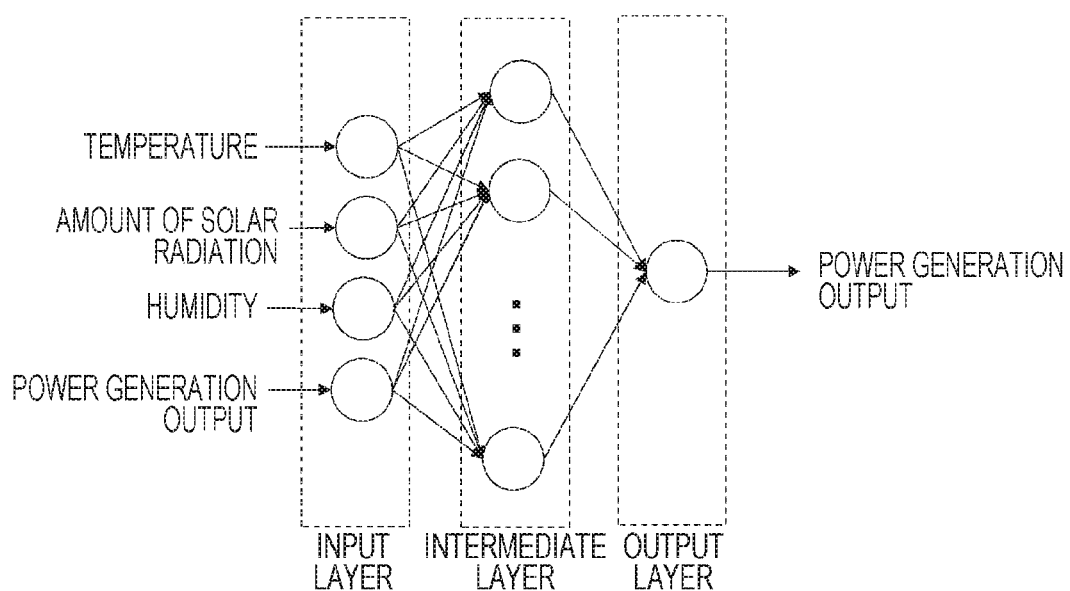
FIG. 17 illustrates a configuration of a solar power generation model.

FIG. 17 illustrates a configuration of the solar power generation model.

The solar power generation model is a model which is represented by the same neural network as that of the wind power generation model, and predicts future power generation output of the solar power generation apparatus 1000 based on past input values of temperature, humidity, the amount of solar radiation, and power generation output.

Other devices, a flow relating to generation of an MWD, and an operation of the present embodiment are the same as those of the first embodiment. However, relevant measurement values may differ in some cases.

Incidentally, the database has been described in the format of being included in the control apparatus 200 in the first and second embodiments, but the database may be a device outside the control apparatus 200.

According to the present embodiment, it is possible to allocate the output to the system into the output of the renewable energy generation apparatus and the two-shaft gas turbine power generation apparatus 100, which is similar to the first embodiment, even when the power generation system includes another renewable energy generation apparatus other than an air volume power generation apparatus.

Third Embodiment

In addition, although the two-shaft gas turbine power generation apparatus 100 has been used in each of the first and second embodiments, the present invention can be also applied to a combined cycle plant. In the present embodiment, a difference from the first embodiment will be described.

Figure 18:
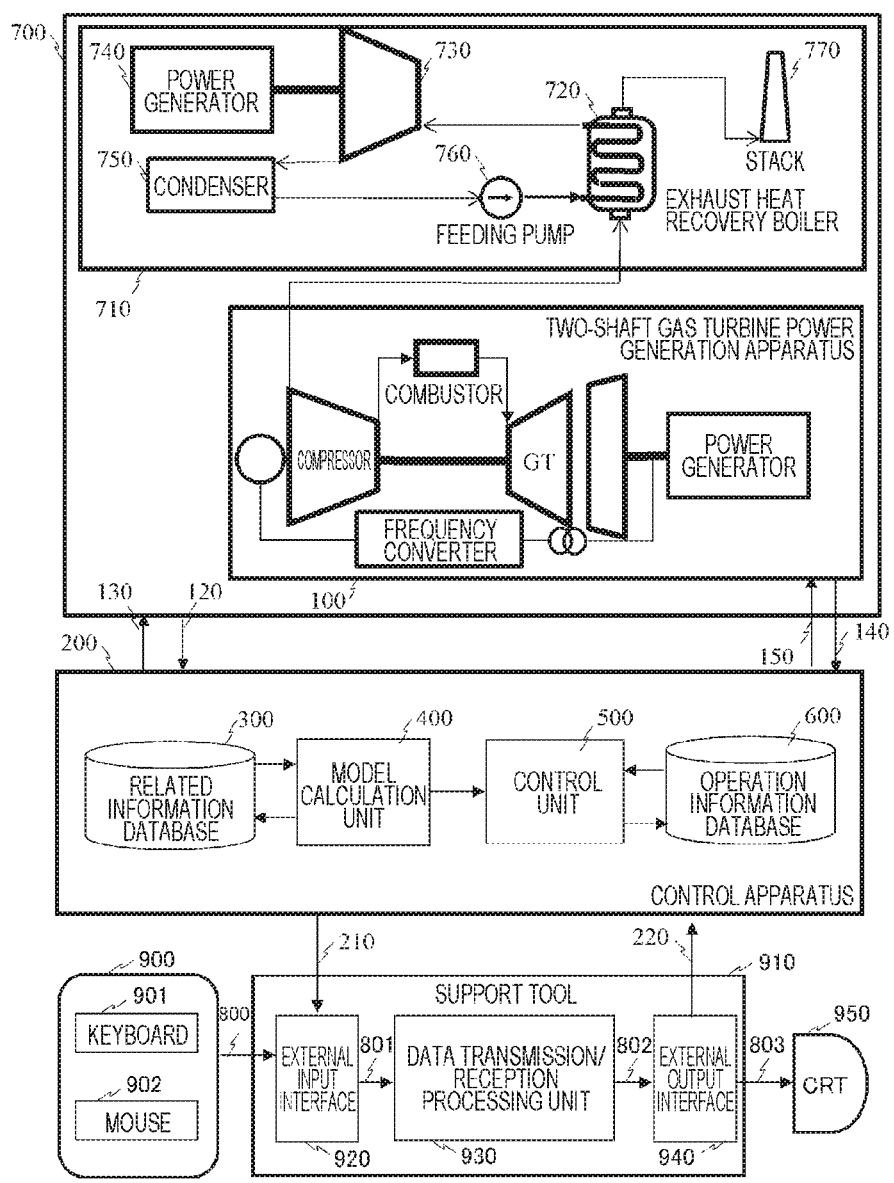
FIG. 18 illustrates a configuration of a power generation system of a third embodiment.

FIG. 18 illustrates a configuration of a power generation system of a third embodiment.

When compared with the power generation system of the first embodiment, the power generation system of the present embodiment includes a steam turbine power generation apparatus 710 instead of the wind power generation apparatus 30. A power generation apparatus obtained by combining the two-shaft gas turbine power generation apparatus 100 and the steam turbine power generation apparatus 710 will be referred to as a combined cycle plant 700. The steam turbine power generation apparatus 710 includes an exhaust heat recovery boiler 720, a steam turbine 730, a power generator 740, a condenser 750, a feeding pump 760, and a stack 770. In the steam turbine power generation apparatus 710, the exhaust heat recovery boiler 720 generates steam through heat exchange using exhaust heat of the exhaust 14 of the two-shaft gas turbine power generation apparatus 100 to drive the steam turbine 730, and the power generator 740 converts a rotational force of the steam turbine 730 into power and outputs the power to the system together with output of the two-shaft gas turbine power generation apparatus 100. The steam discharged from the steam turbine 730 becomes water when being condensed by the condenser 750 and is supplied to the exhaust heat recovery boiler 720 by the feeding pump 760. The exhaust from the exhaust heat recovery boiler 720 is discharged via the stack 770.

The control unit 500 uses the M/G 6 as a brake of the compressor 1 during a normal operation in order for improvement in efficiency of the entire power generation system (plant), then, the air relative to the fuel in the combustor 20 decreases and the exhaust temperature increases, and thus, the generation of steam is promoted due to an increase in heat quantity of the exhaust heat recovery boiler 720, which is connected to the subsequent stage of the gas turbine, thereby obtaining high efficiency as the entire power generation system. The efficiency decreases in terms of the two-shaft gas turbine power generation apparatus 100 alone, and thus, the above-described operation is not normally performed and becomes a unique operation in the combined cycle plant 700.

The control unit 500 executes the same processing as the modified example of the gas turbine control processing, but sets a system output target value as a gas turbine output target value without using a wind power generation output. The model calculation unit 400 uses a dynamic characteristic model of the combined cycle plant 700, as a gas turbine model, instead of the dynamic characteristic model of the two-shaft gas turbine power generation apparatus 100.

Fourth Embodiment

The present invention can be also applied to a plurality of combined cycle plants. In the present embodiment, a difference from the third embodiment will be described.

Figure 19:
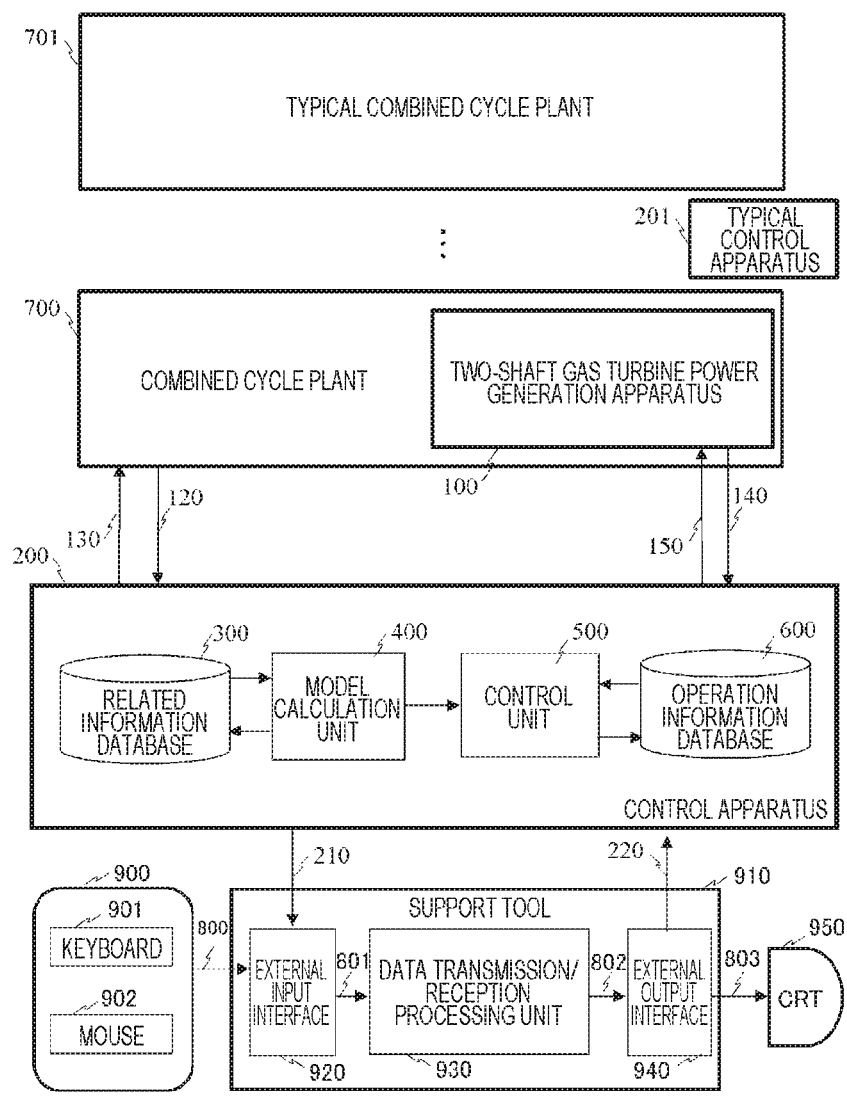
FIG. 19 illustrates a configuration of a power generation system of a fourth embodiment.

FIG. 19 illustrates a configuration of a power generation system of a fourth embodiment.

The power generation system of the present embodiment includes the plurality of combined cycle plants. Any one or more, or all of a plurality of gas turbine power generation apparatuses, which are included, respectively, in the plurality of combined cycle plants, are the same two-shaft gas turbine power generation apparatuses 100 as in the third embodiment. Here, a combined cycle plant including a two-shaft gas turbine power generation apparatus which does not include the M/G 6 will be referred to as a typical combined cycle plant 701, and a control apparatus of the typical combined cycle plant 701 will be referred to as a typical control apparatus 201.

Similarly to the third embodiment, the control unit 500 uses the M/G 6 as a brake of the compressor 1 during the normal operation. As the number of the two-shaft gas turbine power generation apparatuses 100 among the plurality of gas turbine power generation apparatuses increases, the amount of power change, which can track a load variation of the system or a system output target value, increases. Thus, the control unit 500 allocates the system output target value into a gas turbine output target value in a range that does not exceed the change amount with respect to the plurality of gas turbine power generation apparatuses. The control unit 500 may equally allocate the system output target value to the plurality of two-shaft gas turbine power generation apparatuses 100 or may sequentially select one two-shaft gas turbine power generation apparatus 100 among the plurality of two-shaft gas turbine power generation apparatuses 100 and allocate the system output target value to be a maximum change amount that can be tracked with respect to the selected two-shaft gas turbine power generation apparatus 100.

In the third and fourth embodiments, the control unit 500 may perform control such that a change in exhaust temperature is within a proper range set in advance on consideration of the influence of the change in exhaust temperature of the two-shaft gas turbine power generation apparatus 100 may give to thermal stress of the exhaust heat recovery boiler 720, or the operator may monitor the change in exhaust temperature as a monitoring item and set an M/G limit condition using the support tool 910 when it is determined to be necessary. For example, when the M/G limit condition includes a condition of the exhaust temperature, the control unit 500 performs restriction by setting the IMWD to zero (not transmitting the IMWD) in a case in which the change in exhaust temperature exceeds the proper range.

According to the above embodiments, it is unnecessary to provide equipment for a thermoelectric load to correspond to the abrupt generation of surplus power, and thus, it is possible to suppress the cost and size of the power generation system. In addition, it is possible to compensate the mechanical delay of the gas turbine through absorption and release of the kinetic energy of the compressor 1, to track the power generation request, and to suppress the frequency variation of the system. In addition, it is possible to perform the output within a defined range of the system by determining the MWD and the IMWD on the basis of the tolerable amount of the variation set with respect to the system. In addition, it is possible to determine the IMWD on consideration of the output delay of the two-shaft gas turbine power generation apparatus. In addition, it is possible to perform the optimal operation of the gas turbine according to the atmospheric temperature and a load zone through the assist of the compressor 1 using the M/G 6.

Terms used to express the present invention will be described. Examples of the high pressure turbine shaft may include the high pressure turbine shaft 12a or the like. Examples of the compressor may include the compressor 1 or the like. Examples of the combustor may include the combustor 20 or the like. Examples of the high pressure turbine may include the high pressure turbine 2a or the like. Examples of the low pressure turbine shaft may include the low pressure turbine shaft 12b or the like. Examples of the low pressure turbine may include the low pressure turbine 2b or the like. Examples of the first power generator may include the power generator 5 or the like. Examples of the multi-shaft gas turbine may include the gas generator 15 and the power turbine 16 or the like. Examples of the second power generator may include the M/G 6 or the like. Examples of the frequency converter may include the frequency converter 10 or the like. Examples of the transformer may include the transformer 50 or the like. Examples of the control unit may include the GT control apparatus 7a and the control apparatus 200 or the like. Examples of the output target value may include the gas turbine output target value. Examples of the first power generator output instruction value may include the power generator output instruction value (MWD) or the like. Examples of the second power generator output instruction value may include the auxiliary power generator output instruction value (IMWD) or the like. Examples of the inlet guide vane may include the IGV 9 or the like. Examples of the display unit may include the support tool 910 and the image display device 950 or the like. Examples of the renewable energy power generator may include the wind power generation apparatus 30 or the solar power generation apparatus 1000 or the like. Examples of the total output target value may include the system output target value or the like. Examples of the exhaust heat recovery boiler may include the exhaust heat recovery boiler 720 or the like. Examples of the steam turbine may include the steam turbine 730 or the like. Examples of the steam turbine power generator may include the power generator 740 or the like. Examples of the combined cycle plant may include the combined cycle plant 700 or the like.

The present invention is not limited to the above embodiments, and other various modifications can be made within a scope not departing from a gist thereof.

REFERENCE SIGNS LIST 1 compressor
2 turbine
2a high pressure turbine
2b low pressure turbine
5 power generator
7a GT control apparatus
8 fuel flow rate control valve
9 IGV
10 frequency converter
12a high pressure turbine shaft
12b low pressure turbine shaft
14 exhaust
15 gas generator
16 power turbine
20 combustor
26a high pressure turbine rotational speed detector
26b low pressure turbine rotational speed detector
30 wind power generation apparatus
31 wind power generator
50 transformer
100 two-shaft gas turbine power generation apparatus
200 control apparatus
300 related information database
400 model calculation unit
401 model calculation unit
500 control unit
600 operation information database
700 combined cycle plant
710 steam turbine power generation apparatus
720 exhaust heat recovery boiler
730 steam turbine 740 power generator
750 condenser
760 feeding pump
770 stack
1000 solar power generation apparatus
1100 solar pane

The invention claimed is:

1. A power generation system comprising:
a multi-shaft gas turbine that includes
a high pressure turbine shaft,
a compressor which generates compressed air according to rotation of the high pressure turbine shaft,
a combustor which generates a combustion gas by mixing and burning the compressed air and fuel,
a high pressure turbine which rotates by receiving the combustion gas and drives the high pressure turbine shaft,
a low pressure turbine shaft, and
a low pressure turbine which rotates by receiving a gas discharged from the high pressure turbine and drives the low pressure turbine shaft;
a first power generator that is connected to a power system, generates power using the rotation of the low pressure turbine shaft, and outputs the generated power to the power system;
a second power generator that accelerates or decelerates the high pressure turbine shaft according to input or output of power;
a frequency converter that is connected to a terminal of the second power generator;
a transformer that is connected between the frequency converter and a terminal of the first power generator; and
a control unit that stores an output target value as a time-series target value of output of the power generation system, calculates an output prediction value of the first power generator in a case where a combustor is controlled so as to match the output of the first power generator to the output target value using a dynamic characteristic model simulating a dynamic characteristic of the multi-shaft gas turbine, calculates a first power generator output instruction value as an instruction value for the output from the first power generator to the power system and a second power generator output instruction value as an instruction value for the output from the second power generator to the power system based on the output target value and the output prediction value of the first power generator, controls the combustor based on the first power generator output instruction value, and controls the frequency converter based on the second power generator output instruction value,
wherein, when the first power generator output instruction value is smaller than the output target value, the frequency converter performs frequency-conversion of the output of the second power generator and outputs the converted output to the power system based on an instruction from the control unit, accordingly, the second power generator outputs power to be obtained by decelerating the high pressure turbine shaft to the frequency converter, and the transformer boosts the output of the frequency converter and outputs the boosted output to the power system, and
when the first power generator output instruction value is larger than the output target value, the frequency converter performs frequency-conversion of a part of the output of the first power generator and outputs the converted output to the second power generator based on an instruction from the control unit, accordingly, the transformer steps down the part of the output of the first power generator and outputs the stepped-down output to the frequency converter, and the second power generator accelerates the high pressure turbine shaft using the output of the frequency converter.

2. The power generation system according to claim 1, wherein
the control unit stores a frequency converter limit condition which is a condition to limit an operation of the frequency converter, and limits the operation of the frequency converter when it is determined that a state of the power generation system satisfies the frequency converter limit condition.

3. The power generation system according to claim 2, wherein
the frequency converter limit condition includes a coolant temperature limit value which is a limit value of coolant temperature of the transformer, and
the control unit acquires the coolant temperature and stops the operation of the frequency converter when it is determined that the coolant temperature exceeds the coolant temperature limit value.

4. The power generation system according to claim 3, wherein
the frequency converter limit condition includes an instruction value range which is a range of the second power generator output instruction value, and
the control unit changes the second power generator output instruction value to a value within the instruction value range when it is determined that the second power generator output instruction value is outside the instruction value range.

5. The power generation system according to claim 4, wherein
when the output target value increases, the control unit controls the combustor to increase a fuel flow rate of the combustor and controls the frequency converter to decelerate the high pressure turbine shaft using the second power generator, and
when the output target value decreases, the control unit controls the combustor to decrease the fuel flow rate and controls the frequency converter to accelerate the high pressure turbine shaft using the second power generator.

6. The power generation system according to claim 5, further comprising
an inlet guide vane that is provided in an inlet of air flowing into the compressor,
wherein the control unit controls an opening degree of the inlet guide vane according to a number of rotations of the high pressure turbine shaft to keep a flow rate of the compressed air to be substantially constant.

7. The power generation system according to claim 6, wherein
when the number of rotations of the high pressure turbine shaft decreases, efficiency of the compressor is improved, and
when the number of rotations of the high pressure turbine shaft increases, the efficiency of the compressor is reduced.

8. The power generation system according to claim 7, wherein
the control unit calculates the output prediction value of the first power generator as the first power generator output instruction value and calculates the second power generator output instruction value by subtracting the first power generator output instruction value from the output target value.

9. The power generation system according to claim 8, further comprising
a display unit that displays at least any of the output target value, an output measurement value as a measurement value of the output from the power generation system toward the power system, a comparison result between the output target value and the output measurement value, and the coolant temperature.

10. The power generation system according to claim 9, wherein
the control unit calculates a prediction value of a variation in power supply and demand of the power system based on a demand for power in the power system and information relating to other power generators, and calculates the output target value based on the prediction value of the variation in power supply and demand.

11. The power generation system according to claim 10, further comprising
a renewable energy power generator that generates power using renewable energy and outputs the power to the power system,
wherein the control unit stores a total output target value as a target value of a total output of the renewable energy power generator and the power generation system, calculates an output prediction value of the renewable energy power generator, and calculates the output target value by subtracting the output prediction value of the renewable energy power generator from the total output target value.

12. The power generation system according to claim 9, further comprising:
an exhaust heat recovery boiler that heats water using exhaust heat of the gas turbine and generates steam;
a steam turbine that rotates by receiving the steam; and
a steam turbine power generator that generates power using the rotation of the steam turbine and outputs the generated power to the power system,
wherein the dynamic characteristic model indicates a dynamic characteristic of a combined cycle plan which includes the gas turbine, the exhaust heat recovery boiler, the steam turbine, and the steam turbine power generator.

13. The power generation system according to claim 9, wherein
the control unit acquires atmospheric temperature, and controls the frequency converter to cause the second power generator to accelerate the high pressure turbine shaft when the atmospheric temperature is higher than an atmospheric temperature threshold set in advance, and increases a flow rate of the compressed air to increase the output of the first power generator.

14. A power generation method that uses: a multi-shaft gas turbine, which includes a high pressure turbine shaft, a compressor which generates compressed air according to rotation of the high pressure turbine shaft, a combustor which generates a combustion gas by mixing and burning the compressed air and fuel, a high pressure turbine which rotates by receiving the combustion gas and drives the high pressure turbine shaft, a low pressure turbine shaft, and a low pressure turbine which rotates by receiving a gas discharged from the high pressure turbine and drives the low pressure turbine shaft; a first power generator that is connected to a power system, generates power using the rotation of the low pressure turbine shaft, and outputs the generated power to the power system; a second power generator that accelerates or decelerates the high pressure turbine shaft according to input or output of power; a frequency converter that is connected to a terminal of the second power generator; and a transformer that is connected between the frequency converter and a terminal of the first power generator, the method comprising:

storing an output target value as a time-series target value of output of the power generation system;

calculating an output prediction value of the first power generator in a case where a combustor is controlled so as to match the output of the first power generator to the output target value using a dynamic characteristic model simulating a dynamic characteristic of the multi-shaft gas turbine;

calculating a first power generator output instruction value as an instruction value for the output from the first power generator to the power system and a second power generator output instruction value as an instruction value for the output from the second power generator to the power system based on the output target value and the output prediction value of the first power generator;

controlling the combustor based on the first power generator output instruction value;

controlling the frequency converter based on the second power generator output instruction value;

performing frequency-conversion of the output of the second power generator by the frequency converter and outputting the converted output to the power system based on an instruction from the control unit when the first power generator output instruction value is smaller than the output target value, accordingly, outputting power to be obtained by decelerating the high pressure turbine shaft to the frequency converter by the second power generator, and boosting the output of the frequency converter by the transformer and outputting the boosted output to the power system; and performing frequency-conversion of a part of the output of the first power generator by the frequency converter and outputting the converted output to the second power generator based on an instruction from the control unit when the first power generator output instruction value is larger than the output target value, accordingly, stepping down the part of the output of the first power generator by the transformer and outputting the stepped-down output to the frequency converter, and accelerating the high pressure turbine shaft by the second power generator using the output of the frequency converter.

* * * * *